(12) United States Patent
Luo et al.

(10) Patent No.: US 12,015,569 B2
(45) Date of Patent: *Jun. 18, 2024

(54) SEQUENCE GENERATION FOR SYSTEMS SUPPORTING MIXED NUMEROLOGIES

(71) Applicant: QUALCOMM Incorporated, San Diego, CA (US)

(72) Inventors: Tao Luo, San Diego, CA (US); Makesh Pravin John Wilson, San Diego, CA (US); Sumeeth Nagaraja, Los Altos, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,739

(22) Filed: Feb. 18, 2022

(65) Prior Publication Data

US 2022/0173871 A1  Jun. 2, 2022

Related U.S. Application Data

(63) Continuation of application No. 15/713,593, filed on Sep. 22, 2017, now Pat. No. 11,283,575.

(Continued)

(51) Int. Cl.
*H04L 5/00* (2006.01)
*H04L 5/02* (2006.01)
(Continued)

(52) U.S. Cl.
CPC .......... *H04L 5/0007* (2013.01); *H04L 5/0048* (2013.01); *H04L 5/0053* (2013.01);
(Continued)

(58) Field of Classification Search
CPC ... H04L 5/0007; H04L 5/0048; H04L 5/0053; H04L 5/0092; H04L 5/023;
(Continued)

(56) References Cited

U.S. PATENT DOCUMENTS 8,160,018 B2 4/2012 Zhang et al.
8,792,427 B2 7/2014 Damnjanovic et al.
(Continued)

FOREIGN PATENT DOCUMENTS

CN   1130966 A   9/1996
CN   101014029 A   8/2007
(Continued)

OTHER PUBLICATIONS

Convida Wireless: "On Downlink Control Channel Design for New Radio", 3GPP TSG RAN WG1 Meeting #86bis, 3GPP Draft, R1-1610379_DL_Controlchannel_Design [Search Jul. 18, 2021], 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150390, Oct. 1, 2016 (Oct. 1, 2016), 4 Pages, URL: http://www.3gpp.org/ftp/Meetings_3GPP SYNC/RAN1/Docs/ [retrieved on Oct. 9, 2016].

(Continued)

*Primary Examiner* — Jung H Park
(74) *Attorney, Agent, or Firm* — Procopio, Cory, Hargreaves & Savitch LLP

(57) ABSTRACT

Networks that support 5G communication may support different numerologies across and even within a symbol, slot, or subframe. Sequences, such as reference signals or data scrambled with a scrambling code, may be transmitted on resources with such mixed numerologies. In an aspect of the disclosure, a method, a computer-readable medium, and an apparatus are provided. The apparatus may be a user (Continued)

equipment. The UE may be configured to receive an indication of assigned resources for communicating with a base station. The UE may also be configured to determine a numerology associated with the assigned resources, and to determine one or more indices based on the numerology. The UE may also generate a sequence based on the one or more indices and communicate with the base station based on the sequence.

42 Claims, 19 Drawing Sheets

Related U.S. Application Data

(60) Provisional application No. 62/420,462, filed on Nov. 10, 2016.

(51) Int. Cl.
*H04L 27/26* (2006.01)
*H04L 49/552* (2022.01)
*H04W 48/12* (2009.01)
*H04W 72/0446* (2023.01)
*H04W 72/0453* (2023.01)
*H04W 72/23* (2023.01)
*H04W 72/51* (2023.01)

(52) U.S. Cl.
CPC ............ *H04L 5/0092* (2013.01); *H04L 5/023* (2013.01); *H04L 27/2602* (2013.01); *H04L 27/26025* (2021.01); *H04L 49/552* (2013.01); *H04W 72/0446* (2013.01); *H04W 72/23* (2023.01); *H04L 5/0051* (2013.01); *H04L 27/26035* (2021.01); *H04W 48/12* (2013.01); *H04W 72/0453* (2013.01); *H04W 72/51* (2023.01)

(58) Field of Classification Search
CPC ........... H04L 27/2602; H04L 27/26025; H04L 49/552; H04L 5/0051; H04L 27/26035; H04W 72/0446; H04W 72/23; H04W 48/12; H04W 72/0453; H04W 72/51
See application file for complete search history.

(56) References Cited

U.S. PATENT DOCUMENTS

| | | | |
|---|---|---|---|
| 8,824,387 B2 | 9/2014 | Chen et al. | |
| 8,830,883 B2 | 9/2014 | Chen et al. | |
| 9,860,099 B1 | 1/2018 | Noh et al. | |
| 2008/0025267 A1 | 1/2008 | Wei et al. | |
| 2009/0238064 A1* | 9/2009 | Lee ..................... | H04L 25/0226 370/208 |
| 2010/0034312 A1 | 2/2010 | Muharemovic et al. | |
| 2010/0074343 A1 | 3/2010 | Gaal et al. | |
| 2011/0002430 A1 | 1/2011 | Kim et al. | |
| 2011/0038344 A1 | 2/2011 | Chmiel et al. | |
| 2011/0244877 A1 | 10/2011 | Farajidana et al. | |
| 2012/0120882 A1 | 5/2012 | Luo et al. | |
| 2013/0010641 A1 | 1/2013 | Dinan | |
| 2013/0010716 A1 | 1/2013 | Dinan | |
| 2013/0155891 A1 | 6/2013 | Dinan | |
| 2015/0103733 A1 | 4/2015 | Ahmadi | |
| 2015/0180622 A1 | 6/2015 | Yoo et al. | |
| 2015/0208208 A1 | 7/2015 | You et al. | |
| 2015/0319800 A1 | 11/2015 | Park et al. | |
| 2016/0021661 A1 | 1/2016 | Yerramalli et al. | |
| 2016/0270018 A1 | 9/2016 | He et al. | |
| 2016/0286551 A1 | 9/2016 | Lee et al. | |
| 2016/0302185 A1 | 10/2016 | Sun et al. | |
| 2017/0055298 A1 | 2/2017 | Pawar et al. | |
| 2017/0086172 A1 | 3/2017 | Dinan | |
| 2017/0111930 A1 | 4/2017 | Rajagopal et al. | |
| 2017/0201968 A1 | 7/2017 | Nam et al. | |
| 2017/0208574 A1 | 7/2017 | Ramakrishna et al. | |
| 2017/0310516 A1 | 10/2017 | Lee et al. | |
| 2017/0331577 A1 | 11/2017 | Parkvall et al. | |
| 2017/0331670 A1 | 11/2017 | Parkvall et al. | |
| 2017/0332359 A1 | 11/2017 | Tsai et al. | |
| 2017/0373911 A1 | 12/2017 | Lee et al. | |
| 2018/0049047 A1 | 2/2018 | Lin et al. | |
| 2018/0049169 A1 | 2/2018 | Lin et al. | |
| 2018/0092080 A1* | 3/2018 | Kim ..................... | H04L 5/0007 |
| 2018/0123848 A1 | 5/2018 | Nammi et al. | |
| 2018/0131493 A1 | 5/2018 | Luo et al. | |
| 2018/0212725 A1 | 7/2018 | Park et al. | |
| 2020/0229152 A1* | 7/2020 | Park ..................... | H04L 5/0094 |
| 2020/0305122 A1* | 9/2020 | Harada ................. | H04W 48/10 |
| 2020/0336249 A1 | 10/2020 | Yi et al. | |

FOREIGN PATENT DOCUMENTS

| | | |
|---|---|---|
| CN | 101018223 A | 8/2007 |
| CN | 101179819 A | 5/2008 |
| CN | 101924721 A | 12/2010 |
| CN | 101938340 A | 1/2011 |
| CN | 101958865 A | 1/2011 |
| CN | 103560986 A | 2/2014 |
| CN | 104067583 A | 9/2014 |
| CN | 105164965 A | 12/2015 |
| CN | 105245479 A | 1/2016 |
| EP | 0993161 A2 | 4/2000 |
| JP | 2015528246 A | 9/2015 |
| WO | 2007050825 | 5/2007 |
| WO | 2008097038 A2 | 8/2008 |
| WO | 2010129619 A2 | 11/2010 |
| WO | 2011116365 A2 | 9/2011 |
| WO | 2012068141 A1 | 5/2012 |
| WO | 2016004634 A1 | 1/2016 |
| WO | 2016028125 A3 | 4/2016 |
| WO | 2017209585 A1 | 12/2017 |

OTHER PUBLICATIONS

Ericsson: "Impacts on the UL Grant and LCP of Different Numerologies and Flexible TTI Duration", 3GPP TSG-RAN WG2 #96, Tdoc R2-168659, Reno, Nevada, USA, Nov. 14, 2016-Nov. 18, 2016, [Search Jul. 18, 2021], Nov. 5, 2016, pp. 1-4, Internet URL: https://www.3gpp.org/ftp/tsg_ran/WG2_RL2/TSGR2_96/Docs/R2-168659.zip.
ETSI TS 136 211, 3GPP TS 36.211: "3rd Generation Partnership Project; Technical Specification Group Radio Access Network; LTE; Evolved Universal Terrestrial Radio Access (E-UTRA); Physical Channels and Modulation (Release 13)", Standard; 3rd Generation Partnership Project (3GPP), Mobile Competence Centre; 650, Route Des Lucioles; F-06921 Sophia-Antipolis Cedex; France, vol. RAN WG1, No. V13.0.0 (Dec. 2015), Jan. 5, 2016 (Jan. 5, 2016), pp. 1-143, XP051047447, p. 40, http://www.3gpp.org/ftp/Specs/archive/36_series/36.211/36211-d00.zip.
Examiner Initiated Interview Summary in U.S. Appl. No. 15/713,593, dated Aug. 8, 2018, 2 pages.
Huawei, et al., "Discussion on Resource Allocation and Indication on NR", 3GPP TSG RAN WG1 Meeting #87, 3GPP Draft, R1-1611661, [Search Jul. 18, 2021], 3rd Generation Partnership Project (3GPP), Mobile Competence Centre, 650, Route Des Lucioles, F-06921, Sophia-Antipolis Cedex, France, vol. RAN WG1, No. Reno, Nevada, USA, Nov. 14, 2016-Nov. 18, 2016, Nov. 5, 2016, 4 Pages, XP051190065, Retrieved from the Internet: URL: http://www.3gpp.org/ftp/tsg_ran/WG1_RL1/TSGR1_87/Docs/ [retrieved on Nov. 5, 2016].
International Preliminary Report on Patentability—PCT/US2017/053268, The International Bureau of WIPO—Geneva, Switzerland, dated May 23, 2019.
International Search Report and Written Opinion—PCT/US2017/053268—ISA/EPO—dated Dec. 14, 2017.

(56) References Cited

OTHER PUBLICATIONS

NEC: "Remaining Issues on Mixed Numerology in a Single Carrier", R1-1611715, 3GPP Draft, 3GPP TSG RAN WG1 Meeting #87, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14-18, 2016, Nov. 4, 2016, XP051189147, Retrieved from the Internet: URL:http://www.3gpp.org/ftp/tsg_ran/WG1_RL1/TSGR1_87/Docs/ [retrieved on Nov. 4, 2016], 4 pages.

Qualcomm Incorporated: "UL Reference Signal Design for eMBB with CP-OFDM and DFT-s-OFDM", 3GPP TSG-RAN WG1 #86, R1-1610115, [Search Jul. 18, 2021], Oct. 10-14, 2016, (Oct. 14, 2016), 3 Pages, Oct. 1, 2016, Internet URL: https://www.3gpp.org/ftp/TSG_RAN/WG1_RL1/TSGR1_86b/Docs/R1-1610115.zip.

Ericsson: "Impacts on the UL Grant and LCP of Different Numerologies and Flexible TTI Duration", 3GPP TSG-RAN WG2 #96, Tdoc R2-168659, Reno, Nevada, USA, Nov. 14, 2016-Nov. 18, 2018, [Search Jul. 18, 2021], Nov. 5, 2016, pp. 1-4, Internet URL: https://www.3gpp.org/ftp/tsg_ran/WG2_RL2/TSGR2_96/Docs/R2-168659.zip.

\* cited by examiner

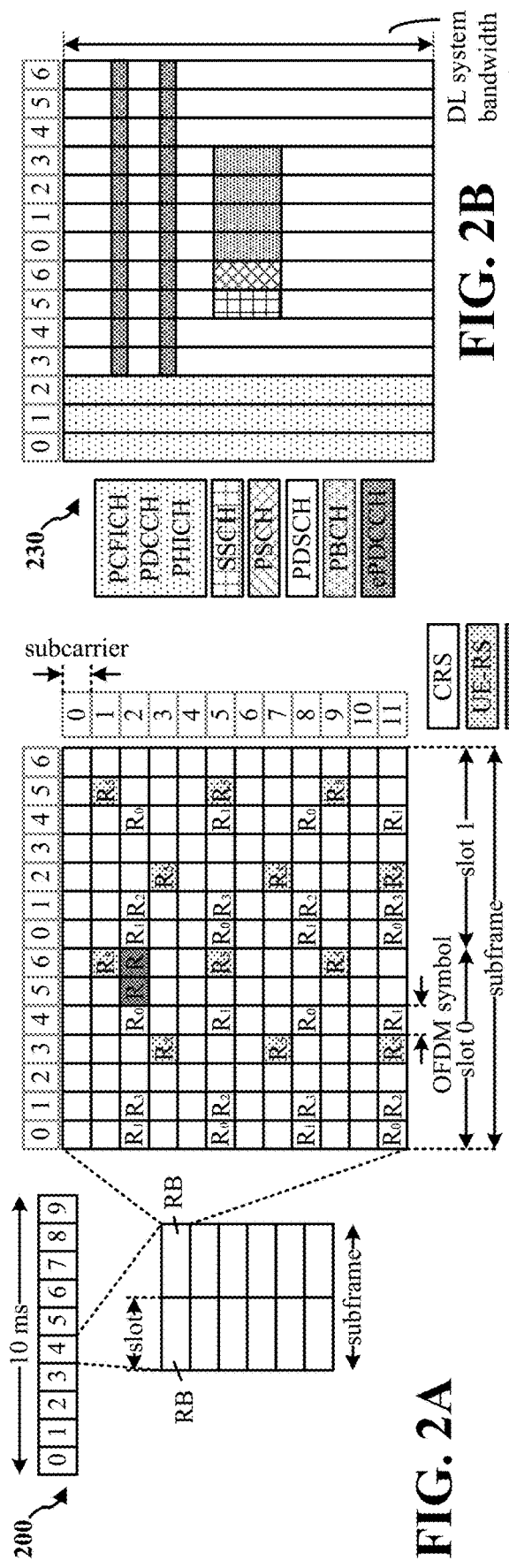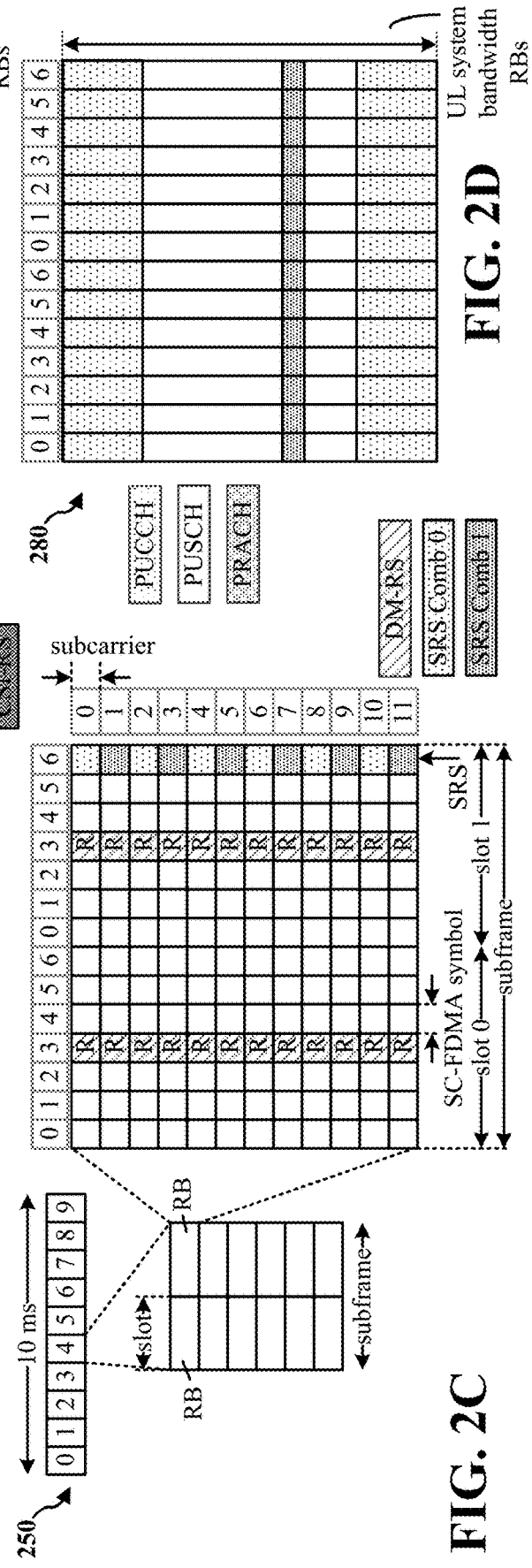

SEQUENCE GENERATION FOR SYSTEMS SUPPORTING MIXED NUMEROLOGIES

CROSS-REFERENCE TO RELATED APPLICATION(S)

This application is a continuation of U.S. Non-provisional application Ser. No. 15/713,593, now U.S. Pat. No. 11,283,575, entitled "SEQUENCE GENERATION FOR SYSTEMS SUPPORTING MIXED NUMEROLOGIES" and filed on Sep. 22, 2017, which claims the benefit of U.S. Provisional Application Ser. No. 62/420,462, entitled "SEQUENCE GENERATION FOR SYSTEMS SUPPORTING MIXED NUMEROLOGIES" and filed on Nov. 10, 2016, each of which is expressly incorporated by reference herein in its entirety.

BACKGROUND

Field

The present disclosure relates generally to communication systems, and more particularly, to sequence generation for systems supporting mixed numerologies.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

5G (or new radio (NR)) systems may support different numerologies within a subframe or another type of resource. New designs and signaling are needed to support different numerologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Networks that support 5G communication may support different numerologies (e.g., at least one of a subcarrier spacing or a symbol duration associated with the assigned resources) across and even within a subframe or symbol. For example, two different subframes may have different subcarrier spacing, symbols within a subframe may have different subcarrier spacing, and resource blocks within a symbol may have different subcarrier spacing. Scalable numerologies that may be supported include subcarrier spacings of 3.75 kHz, 7.5 kHz, 15 kHz, 30 kHz, 60 kHz, 120 kHz, 240 kHz, 480 kHz, and other values. In an aspect, sequences, such as reference signals or data scrambled with a scrambling code, may be transmitted on resources with mixed numerologies. An aspect may perform scrambling by generating a PN scrambling sequences using a linear-feedback-shift-register (LFSR). Different sequences may be generated using different seeds for the LFSR. The seed may be a function of an RB index, OFDM symbol index, symbol index, and/or other indices depending on the type of channel (PUSCH, PDSCH, etc.). In an aspect, this framework may apply to new radio (NR) as well. Because the indices (RB/OFDM symbol/slot index) may be part of the seed, an aspect may determine the indices in case of mixed numerology. A need exists to determine how to generate reference signals and scrambling codes for a resource (e.g., a symbol) with mixed numerology.

In an aspect of the disclosure, a method, a computer-readable medium, and an apparatus are provided. The apparatus may be a user equipment (UE). The UE may be configured to receive an indication of assigned resources for communicating with a base station. The UE may also be configured to determine a numerology comprising at least one of a subcarrier spacing or a symbol duration associated with the assigned resources. Additionally, the UE may be configured determine one or more indices for the assigned resources based on the numerology. The UE may also generate a sequence based on the one or more indices and communicate with the base station based on the sequence.

In another aspect of the disclosure, a method, a computer-readable medium, and an apparatus are provided. The apparatus may be a base station. The apparatus may be configured to determine a numerology associated with a resource. The apparatus may be configured to transmit the determined numerology associated with the resource. The apparatus may be configured to communicate a signal over the resource based on the transmitted numerology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
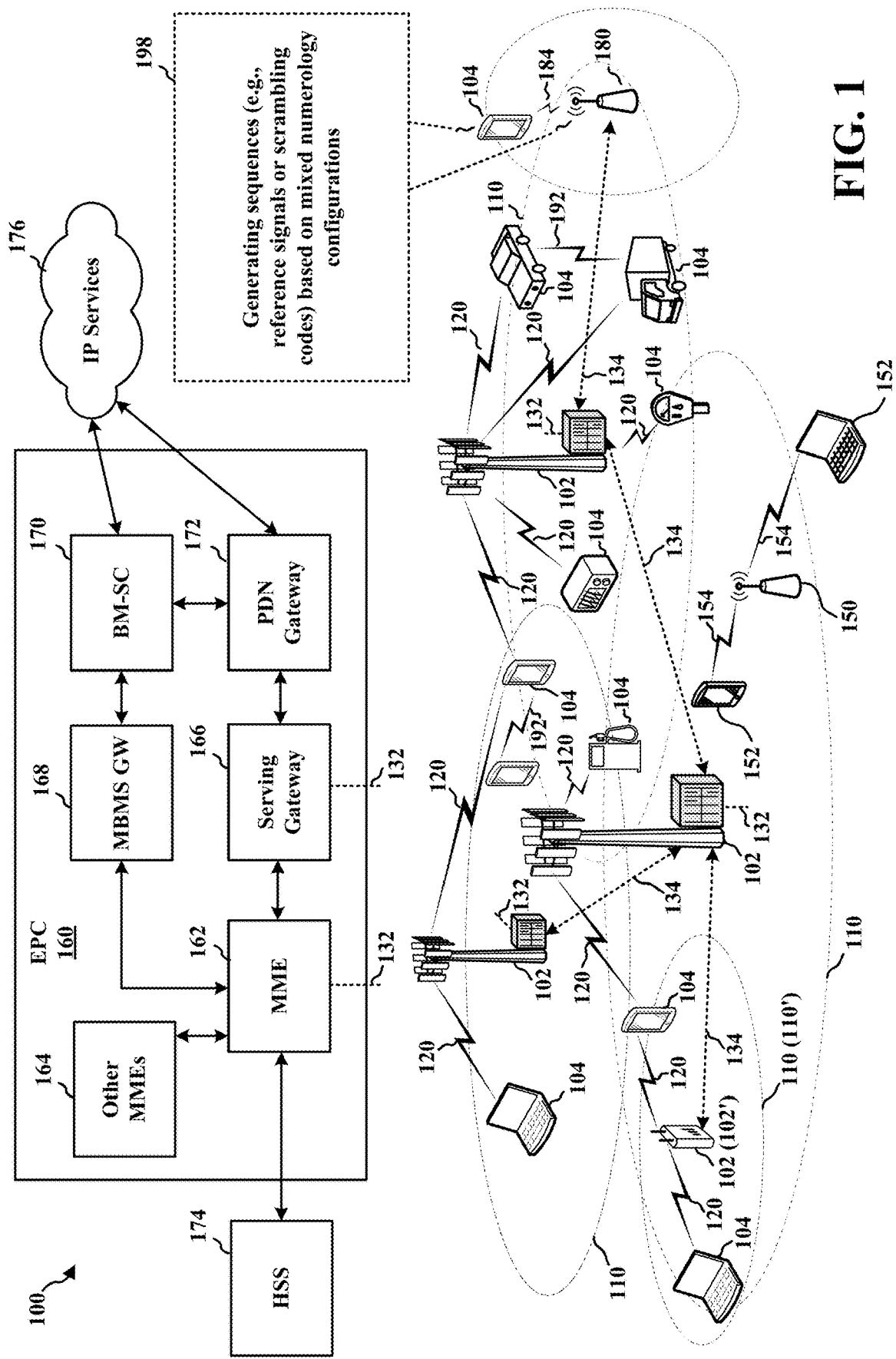
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured to generate sequences (e.g., reference signals or scrambling codes) based on mixed numerologies (198).

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame, and the SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
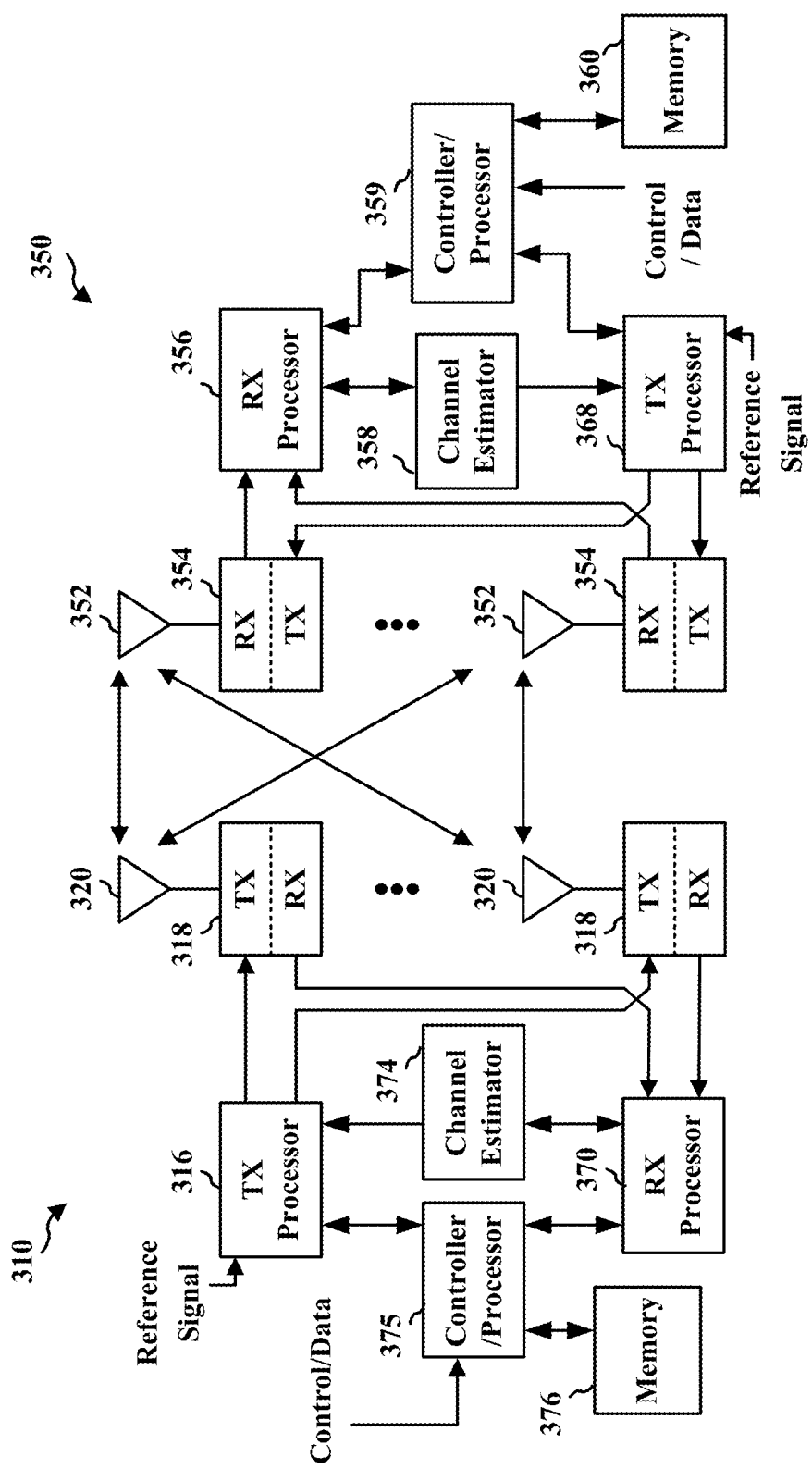
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figures 4A, 4B:
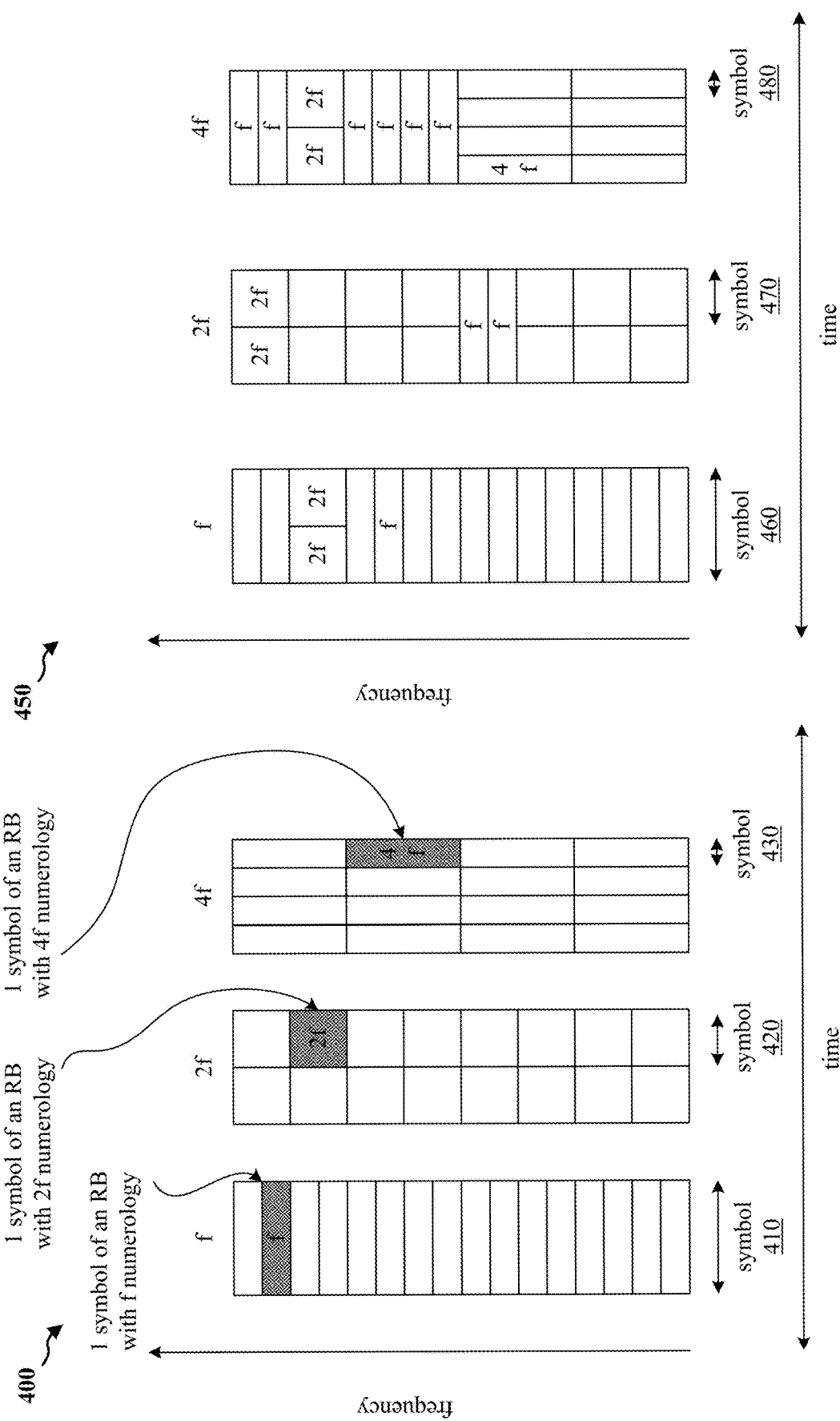
FIGS. 4A and 4B are first and second diagrams illustrating symbols within a resource block.

FIGS. 4A and 4B are first and second diagrams 400, 450 illustrating symbols within a resource block. Referring to FIG. 2A, each subframe may include multiple slots, and each slot may include multiple RBs. Each RB within the slot may include multiple symbols and span a subset of the frequency bandwidth associated with the subframe. For example, in LTE systems, a resource block may include 12 consecutive subcarriers/tones for the duration of one slot (7 symbol periods using a normal cyclic prefix). FIG. 4A illustrates a first symbol 410 of a set of symbols associated with a first RB, a second symbol 420 of a set of symbols associated with a second RB, and a third symbol 430 of a set of symbols associated with a third RB. The first symbol 410 may have a subcarrier spacing f, the second symbol 420 may have subcarrier spacing 2f, and the third symbol 430 may have a subcarrier spacing 4f. The symbol duration for the second symbol 420 is half the symbol duration of the first symbol 410. The symbol duration for the third symbol 430 is a quarter of the symbol duration for the first symbol 410. As shown in FIG. 4A, there are no mixed numerologies within the same symbol. However, different symbols or RBs may have different numerologies.

By contrast, FIG. 4B illustrates symbols with different subcarrier spacings, including a fourth symbol 460 of a set of symbols associated with a fourth RB, a fifth symbol 470 of a set of symbols associated with a fifth RB, and a sixth symbol 480 within a set of symbols associated with a sixth RB. The fourth symbol 460 may be associated with resource blocks having two different subcarrier spacings—f and 2f. Similarly, the fifth symbol 470 may be associated with resource blocks having f and 2f subcarrier spacings. The sixth symbol 480 may be associated with resource blocks with three different subcarrier spacings—f, 2f, and 4f. Tones or subcarriers, within the same resource block having the same numerology, are orthogonal to each other. To maintain orthogonal, the subcarrier spacing and the symbol duration may be inversely proportional. Tones or subcarriers across resource blocks with different numerologies, however, may not be orthogonal to each other.

In wireless communication systems, UEs and base stations may utilize sequences, which may refer to reference signals and scrambling codes, that span one or more tones or one or more RBs within the frequency domain for a numerology. That is, the sequences may be a function of an RB index, or any other index such as a symbol index, a frequency subcarrier index, and/or a symbol index of a resource having a particular numerology. In one example, the various indices may be used to generate a DM-RS, a CSI-RS, an SRS, and/or a measurement reference signal (MRS). In another example, the various indices may be used to generate a scrambling code used to scramble data before transmission, in which the scrambling code identifies the transmitter of data at the physical layer to enable the receiver to differentiate among transmitters.

Sequences for each numerology may be a function of an RB index, a symbol index, a frequency subcarrier index, or a symbol index for the specific numerology. For example, if f, 2f, and 4f subcarrier spacings are provided, each of the subcarrier spacings may have a reference sequence. For symbols with mixed numerologies in the frequency domain, the sequence for the particular subcarrier location or RB location using subcarrier spacing $f_0$, where $f_0$ may be equal to f, may be determined by the reference sequence at the corresponding subcarrier or RB location in a symbol having a uniform numerology of $f_0$. The following disclosure provides details on how the sequence, including reference signals and scrambling codes, may be generated for symbols with mixed numerologies. In general, the subcarrier spacings may be multiples of each other, e.g., to allow for mixed numerologies. When subcarrier spacings are multiples of each other the subcarrier spacing of one numerology may evenly interleave with the subcarrier spacings of another numerology.

Figure 5:
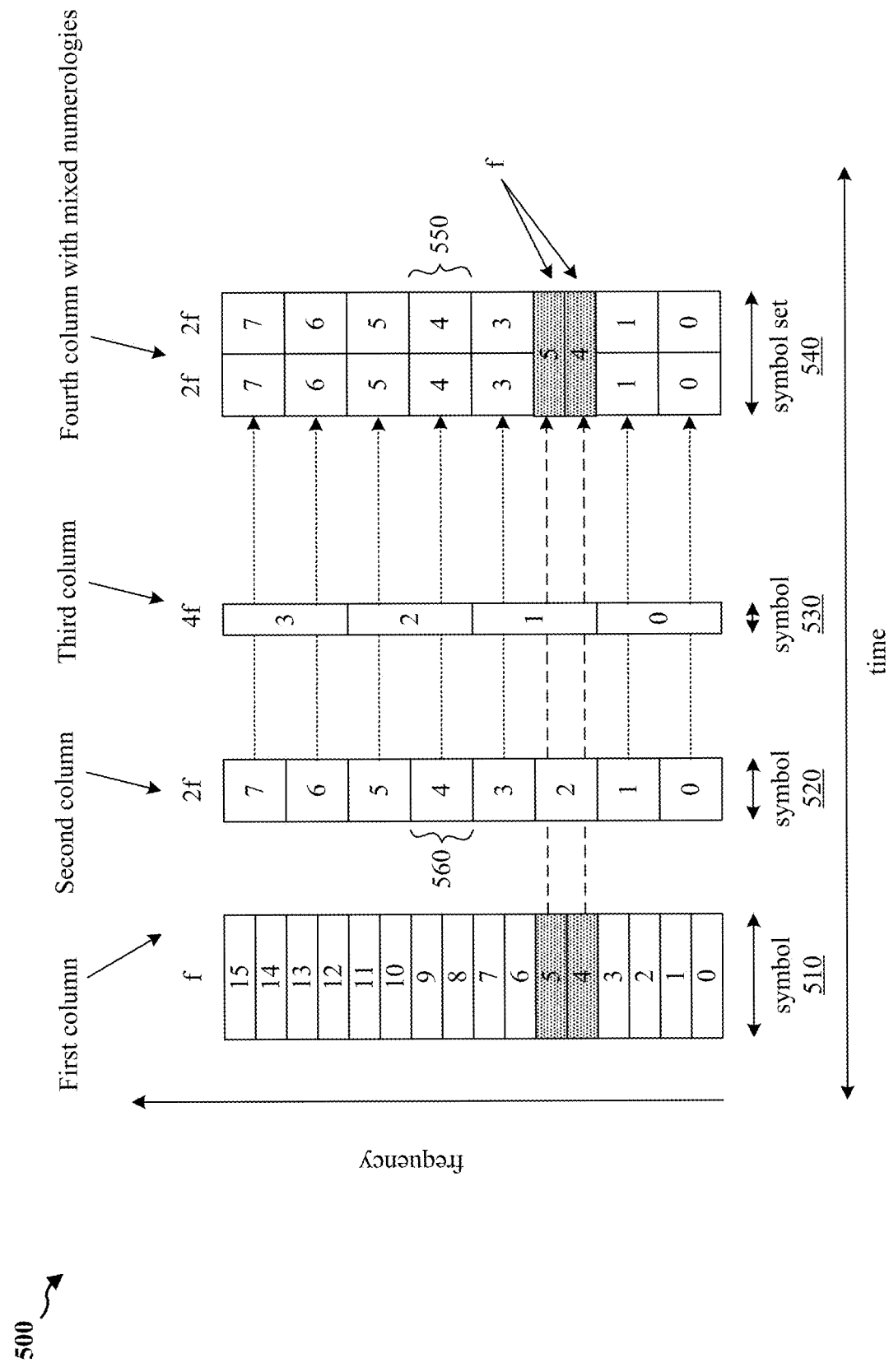
FIG. 5 illustrates a diagram of a first example of indices determination.

FIG. 5 illustrates a diagram 500 of a first example of indices determination. FIG. 5 illustrates the RB index numbering for different numerologies (f, 2f, 4f, etc.) or subcarrier spacings. The numerology f may include 16 total RBs over the bandwidth, and the RB indices may range from 0 to 15. The numerology 2f may include 8 total RBs over the bandwidth, and the RB indices may range from 0 to 7. The numerology 4f may include 4 total RBs over the bandwidth, and the RB indices may range from 0 to 3. FIG. 5 depicts a first symbol 510, a second symbol 520, and a third symbol 530, each of which correspond to a symbol associated with a respective RB of the respective RB index. For simplicity, additional symbols for each respective RB are not shown. In an aspect, each of the RBs, regardless of numerology, may include multiple subcarriers, e.g., 12 subcarriers.

In some configurations, as provided in the fourth column of FIG. 5, mixed numerologies may be utilized. For example, a set of symbols 540 may have 2 symbols or another number of symbols. Most of the RBs associated with the set of symbols 540 may have a 2f numerology except that two of the RBs may have an f numerology. For the RBs with the 2f numerology, the RB index for each RB associated with the set of symbols 540 may be based on the respective RB index for each corresponding RB in a reference time-frequency grid in which all the RBs have the 2f numerology (e.g., a reference time-frequency grid such as a pair of columns such as the column of the second symbol 520). In an aspect, the corresponding RB may be an RB with an identical or similar start and stop frequency subcarriers. Similarly, for the RBs with an f numerology, the RB index for each of the two RBs may be based on the respective RB index for each corresponding RB in a reference time-frequency grid in which all of the RBs have the f numerology. As such, the RB indices for the RBs with the 2f numerology are 0, 1, 3, 4, 5, 6, 7 and the RB indices for the RBs with the f numerology are 4 and 5.

Figure 6:
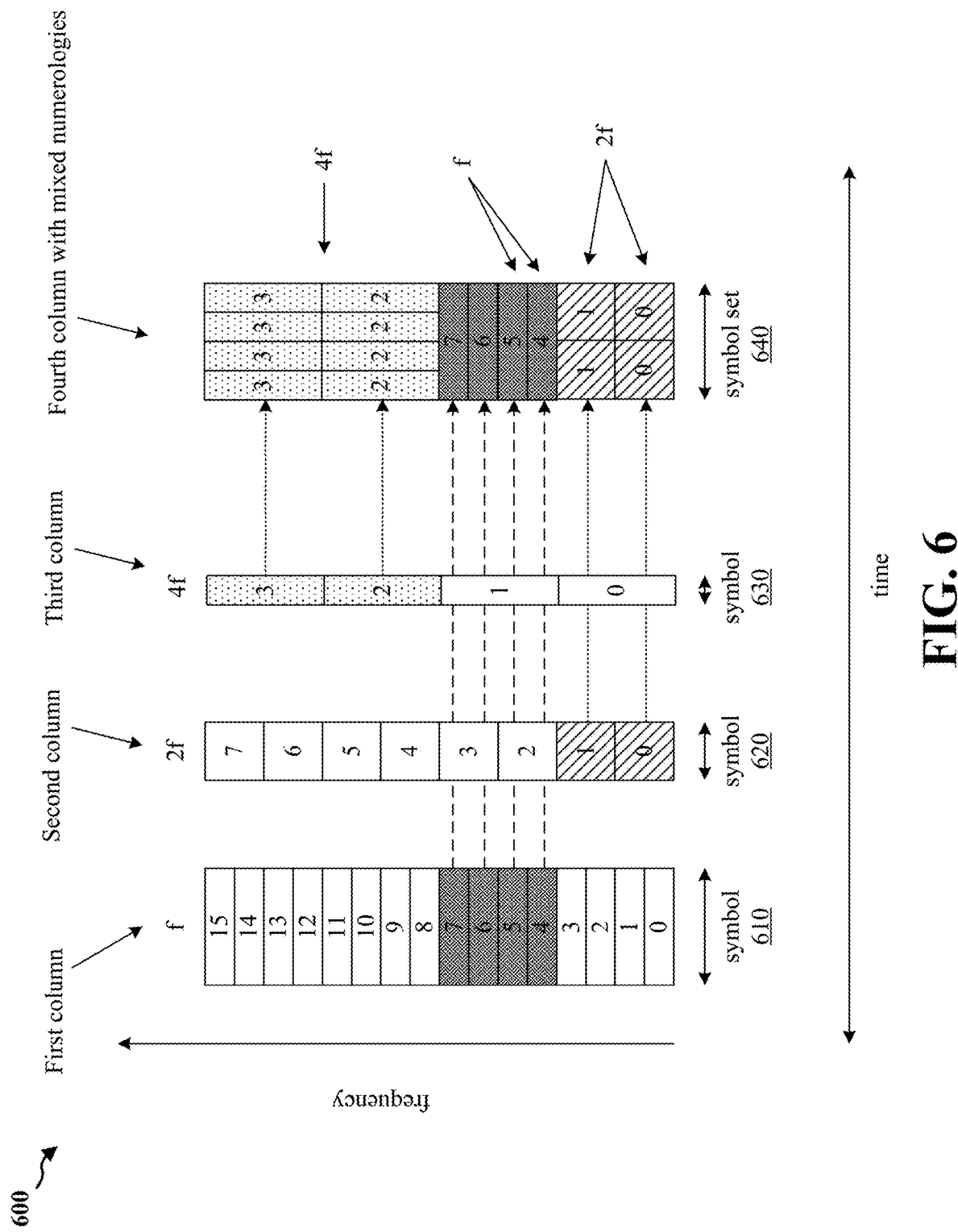
FIG. 6 illustrates a diagram of a second example of indices determination.

FIG. 6 illustrates a diagram 600 of a second example of indices determination. Like FIG. 5, FIG. 6 illustrates the RB index numbering for different numerologies (f, 2f, 4f, etc.). For numerology f, 16 total RBs may be allocated over the bandwidth, and the RB indices may range from 0 to 15. For numerology 2f, 8 total RBs may be allocated over the bandwidth, and the RB indices may range from 0 to 7. For numerology 4f, 4 total RBs may be allocated over the bandwidth, and the RB indices may range from 0 to 3. FIG. 6 depicts a first symbol 610, a second symbol 620, and a third symbol 630, each of which correspond to a symbol within each respective RB associated with the respective RB index. For simplicity, additional symbols for each respective RB are not shown. In an aspect, each of the RBs, regardless of numerology, may include multiple subcarriers, e.g., 12 subcarriers.

In some configurations, as provided in the fourth column of FIG. 6, mixed numerologies may be utilized. For example, a set of symbols 640 may have 2 symbols or another number of symbols. The RBs associated with the set of symbols 640 may have f, 2f, and 4f numerology (and any other number of numerologies). For the RBs with the 2f numerology, the RB index for each RB associated with the set of symbols 640 may be based on the respective RB index for each corresponding RB in a reference time-frequency grid in which all the RBs have the 2f numerology (or subcarrier spacing). In an aspect, the corresponding RB may be an RB with an identical or similar start and stop frequency subcarriers. Referring to FIG. 6, the RB indices for the RBs with 2f numerology are 0 and 1. Similarly, for the RBs with an f numerology, the RB index for each of the four RBs may be based on the respective RB index for each corresponding RB in a reference time-frequency grid in which all of the RBs have the f numerology. In this example, the RB indices for the RBs with f numerology are 4, 5, 6, and 7. For RBs with a 4f numerology, the RB index for each of the 2 RBs may be based on the respective RB index for each corresponding RB in a reference time-frequency grid in which all of the RBs have 4f numerology. In this example, the RB indices for the RBs with 4f numerology are 2 and 3. Symbols 610, 620, 630, and 640, each illustrate different numerologies for the different symbols.

Figure 7:
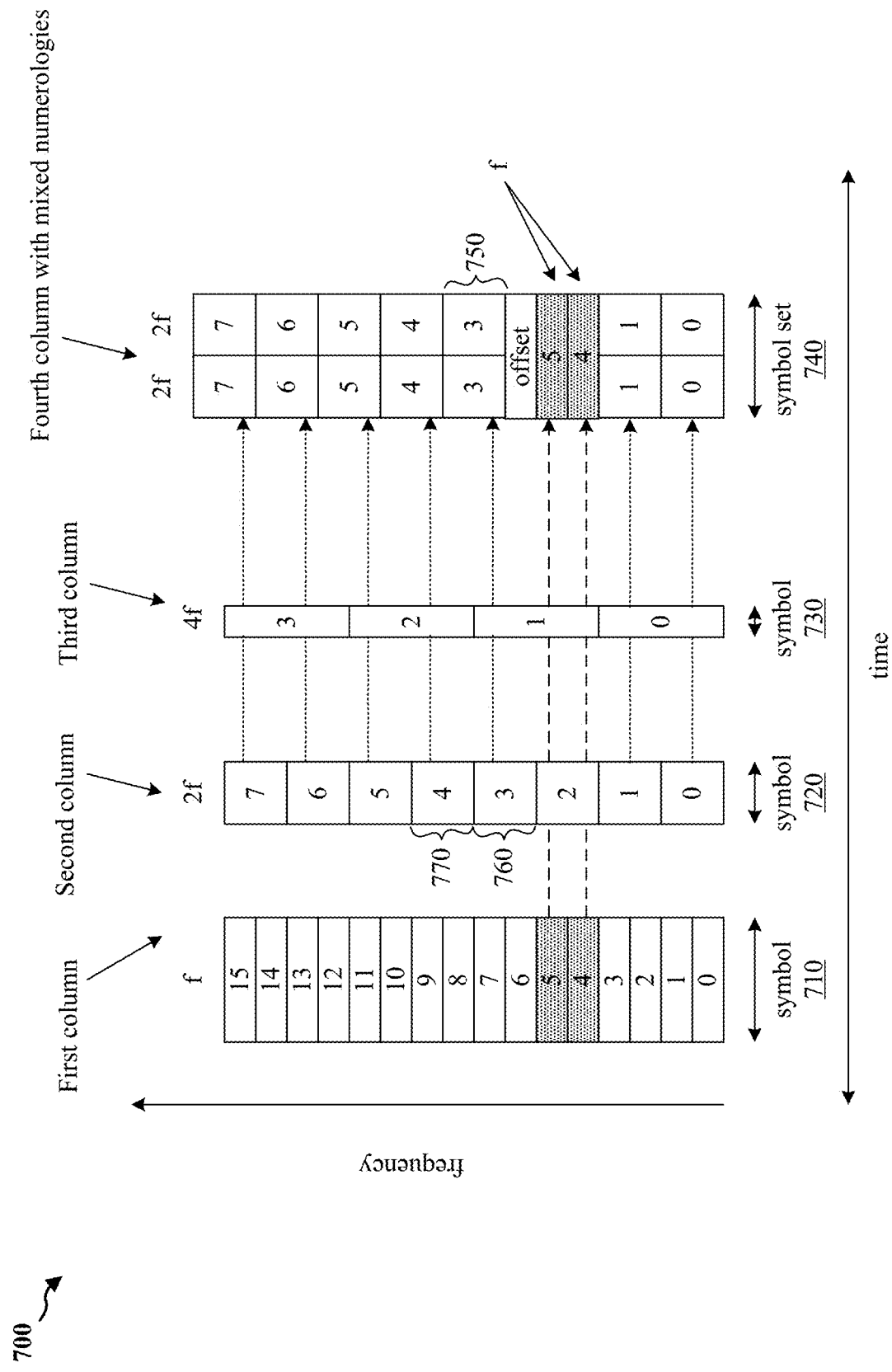
FIG. 7 illustrates a diagram of a third example of indices determination.

FIG. 7 illustrates a diagram 700 of a third example of indices determination. FIG. 7 illustrates the RB index numbering for different numerologies (f, 2f, 4f, etc.). For numerology f, 16 total RBs may be allocated over the bandwidth, and the RB indices may range from 0 to 15. For numerology 2f, 8 total RBs may be allocated, and the RB indices may range from 0 to 7. For numerology 4f, 4 total RBs may be allocated, and the RB indices may range from 0 to 3. FIG. 7 depicts a first symbol 710, a second symbol 720, and a third symbol 730, each of which correspond to a symbol within each respective RB associated with the respective RB index. For simplicity, additional symbols for each respective RB are not shown. In an aspect, each of the RBs, regardless of numerology, may include multiple subcarriers, such as 12 subcarriers.

In some configurations, as provided in the fourth column of FIG. 7, mixed numerologies may be utilized. For example, a set of symbols 740 may have 2 symbols or another number of symbols. Most of the RBs associated with the set of symbols 740 may have a 2f numerology except that two of the RBs may have an f numerology. For the RBs with an f numerology, the RB index for each of the two RBs may be based on the respective RB index for each corresponding RB in a corresponding subframe in which all of the RBs have the f numerology. As such, the RB indices for the RBs with the f numerology are 4 and 5.

Unlike the RBs in FIG. 5, however, some of the RBs with 2f numerology in the fourth column of FIG. 7 may not all match exactly with the corresponding RBs in the second column of a reference time-frequency grid in which all of the numerologies are 2f. The RBs with indices 0 and 1 may match (e.g., have the same start and stop frequency subcarrier indices) with those in second column. However, the remaining RBs may not match exactly due to a frequency offset. The frequency offset may be the result of a different number of guard tones, guard bands, or a guard band size in between RBs when mixed numerologies are used in the fourth column. To determine the RB index when the RBs do not exactly match in frequency, a closest corresponding RB may be determined.

By way of illustration, the RB index for RB 750 will be determined. In a first configuration, the corresponding RB to the RB 750 may be RB 760, which overlaps with RB 750 but has a starting frequency that is less than the starting frequency of the RB 750. In this configuration, the RB index for RB 750 is 3. In a second configuration, the corresponding RB to the RB 750 may be RB 770, which overlaps with RB 750 but has a starting frequency that is greater than the starting frequency of the RB 750. In this configuration, the RB index for RB 750 is 4. In the example illustrated in FIG. 7, the first configuration was used. In the aspect, an RB that overlaps in frequency with the RB 750 may be considered a candidate for the closest corresponding RB. Using different numerologies may allow for different sized resource blocks in time and frequency. Different sized resource blocks in time and frequency may allow for the selection of time/frequency resources best suited to particular data to be transmitted.

Figure 8:
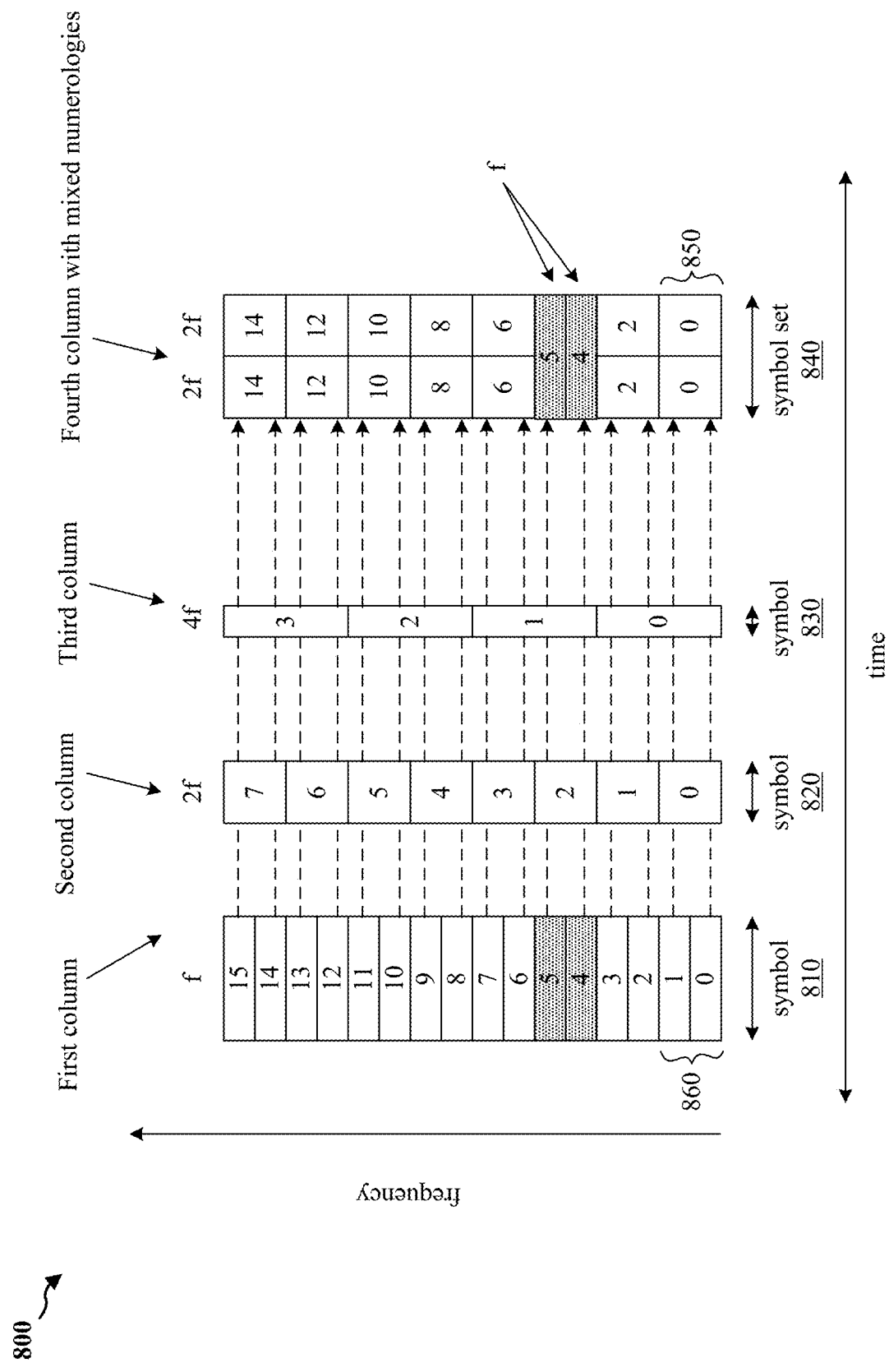
FIG. 8 illustrates a diagram of a fourth example of indices determination.

FIG. 8 illustrates a diagram 800 of a fourth example of indices determination. FIG. 8 illustrates the RB index numbering for different numerologies (f, 2f, 4f, etc.). For numerology f, 16 total RBs may be allocated over the bandwidth, and the RB indices may range from 0 to 15. For numerology 2f, 8 total RBs may be allocated, and the RB indices may range from 0 to 7. For numerology 4f, 4 total RBs may be allocated, and the RB indices may range from 0 to 3. FIG. 8 depicts a first symbol 810, a second symbol 820, and a third symbol 830, each of which correspond to a symbol within each respective RB associated with the respective RB index. For simplicity, additional symbols for each respective RB are not shown. In an aspect, each of the RBs, regardless of numerology, may include multiple subcarriers, e.g., 12 subcarriers.

In some configurations, as provided in the fourth column of FIG. 8, mixed numerologies may be utilized. For example, a set of symbols 840 may have 2 symbols or another number of symbols. Most of the RBs associated with the set of symbols 840 may have a 2f numerology except that two of the RBs may have an f numerology. To determine the RB indices for the RBs in the fourth column, a device may determine one or more corresponding RBs in a reference time-frequency grid having a second numerology that has a subcarrier spacing which is less than or equal to the subcarrier spacing the RB in the fourth column. In an aspect, the second numerology may have the smallest possible subcarrier spacing. For example, to determine the RB index for the RB 850, which has a 2f numerology, a reference time-frequency grid in which all the RBs have an f numerology may be used. The reference time-frequency grid may have RBs as shown in the first column of FIG. 8, and the device may determine one or more corresponding RBs 860 in the reference time-frequency grid that overlap with the RB 850 and select the RB index associated with one of the one or more corresponding RBs 860. In this case, the device may select RB index 0 or 1. The device may select the RB index associated with the lowest frequency RB (RB index 0) or select the RB index associated with the highest frequency RB (RB index 1). Accordingly, as illustrated in the fourth column of FIG. 8, mixed numerologies may be used by a single UE. A UE using mixed numerology may process multiple numerologies during a same period. With mixed numerology, the frequency (bandwidth) may be divided into separate frequency parts or bandwidth-parts (BWPs). One or more of the BWPs may have different numerologies.

Figure 9:
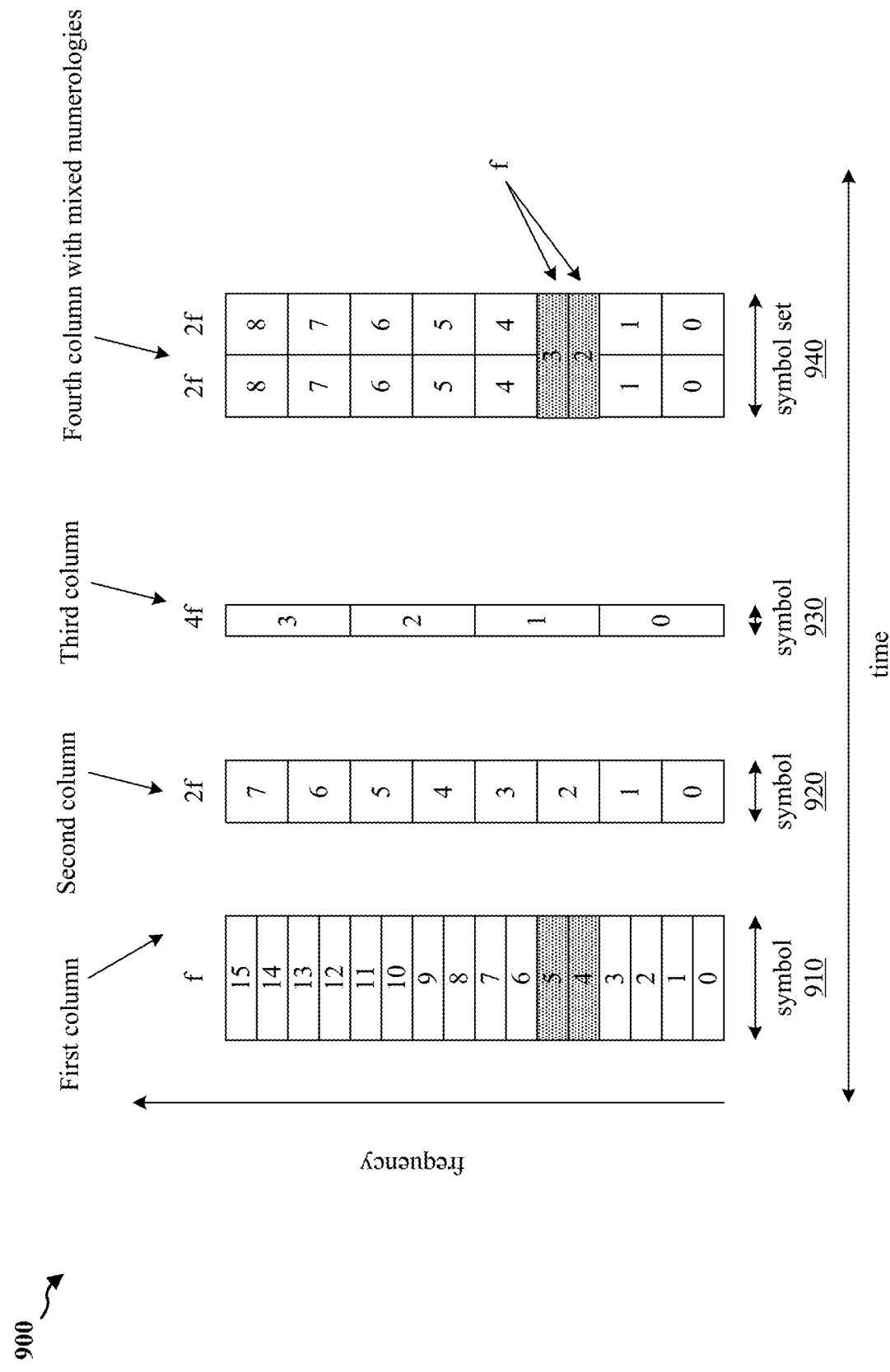
FIG. 9 illustrates a diagram of a fifth example of indices determination.

FIG. 9 illustrates a diagram 900 of a fifth example of indices determination. FIG. 9 illustrates the RB index numbering for different numerologies (f, 2f, 4f, etc.). For numerology f, 16 total RBs may be allocated over the bandwidth, and the RB indices may range from 0 to 15. For numerology 2f, 8 total RBs may be allocated, and the RB indices may range from 0 to 7. For numerology 4f, 4 total RBs may be allocated, and the RB indices may range from 0 to 3. FIG. 9 depicts a first symbol 910, a second symbol 920, and a third symbol 930, each of which correspond to a symbol within each respective RB associated with the respective RB index. For simplicity, additional symbols for each respective RB are not shown. In an aspect, each of the RBs, regardless of numerology, may include multiple subcarriers, e.g., 12 subcarriers.

In an aspect, a scheme may be specified in an air-interface specification for concreteness to avoid the ambiguity. Either approach might be selected in the air-interface for a communications system. In an aspect, mixed numerologies may be used. Mixed numerologies may provide for different UEs in the same system bandwidth that may have different capabilities and support different numerologies. For some communications systems, bandwidth may be divided into bandwidth-parts (BWPs). The UE may have capability to receive only one (or some subset) of the BWPs. Different BWPs may have different numerology. Mixing numerologies more dynamically (e.g., within a slot) may be used in some aspects. In an aspect, a reference time-frequency grid may be determined using one or more of multiple options described herein, however, the scheme that is adopted should be unambiguously specified so both a gNB and a UE have a common understanding of what procedure to use.

In some configurations, as provided in the fourth column of FIG. 9, mixed numerologies may be utilized. For example, a set of symbols 940 may have 2 symbols or another number of symbols. Most of the RBs associated with the set of symbols 940 may have a 2f numerology except that two of the RBs may have an f numerology. Unlike in the previous examples in which the RB index is determined by matching the assigned RB to a corresponding RB in reference time-frequency grid, the RB index in FIG. 9 may be determined by the position of the RB among other RBs within the subframe. That is, the RB corresponding to the lowest starting frequency subcarrier may have an RB index 0. The RB with the next lowest starting frequency subcarrier may have an RB index 1. As shown in FIG. 9, RB indices 0-8 may be determined in a counting fashion. In an example, to determine the RB index, a device may acquire knowledge of the locations of all the other RBs within the bandwidth or at least the locations of RBs preceding the assigned RB in frequency. This is different from the previous examples, in which a device may determine an RB index of the RB assigned to the device with only the information about the assigned RB and does not need the information of other RBs not assigned to the device. Accordingly, the example of FIG. 8 may be preferable to the example of FIG. 9 when for a device with only the information about the assigned RB because the device does not need the information of other RBs not assigned to the device while the example of FIG. 9 may be used for devices that are assigned all the RBs in a symbol set.

In an aspect, the methods, techniques, and protocols described in FIGS. 5-9 for determining an RB index may also be applied for determining a symbol index, a frequency subcarrier index, and/or a symbol index.

Figure 10:
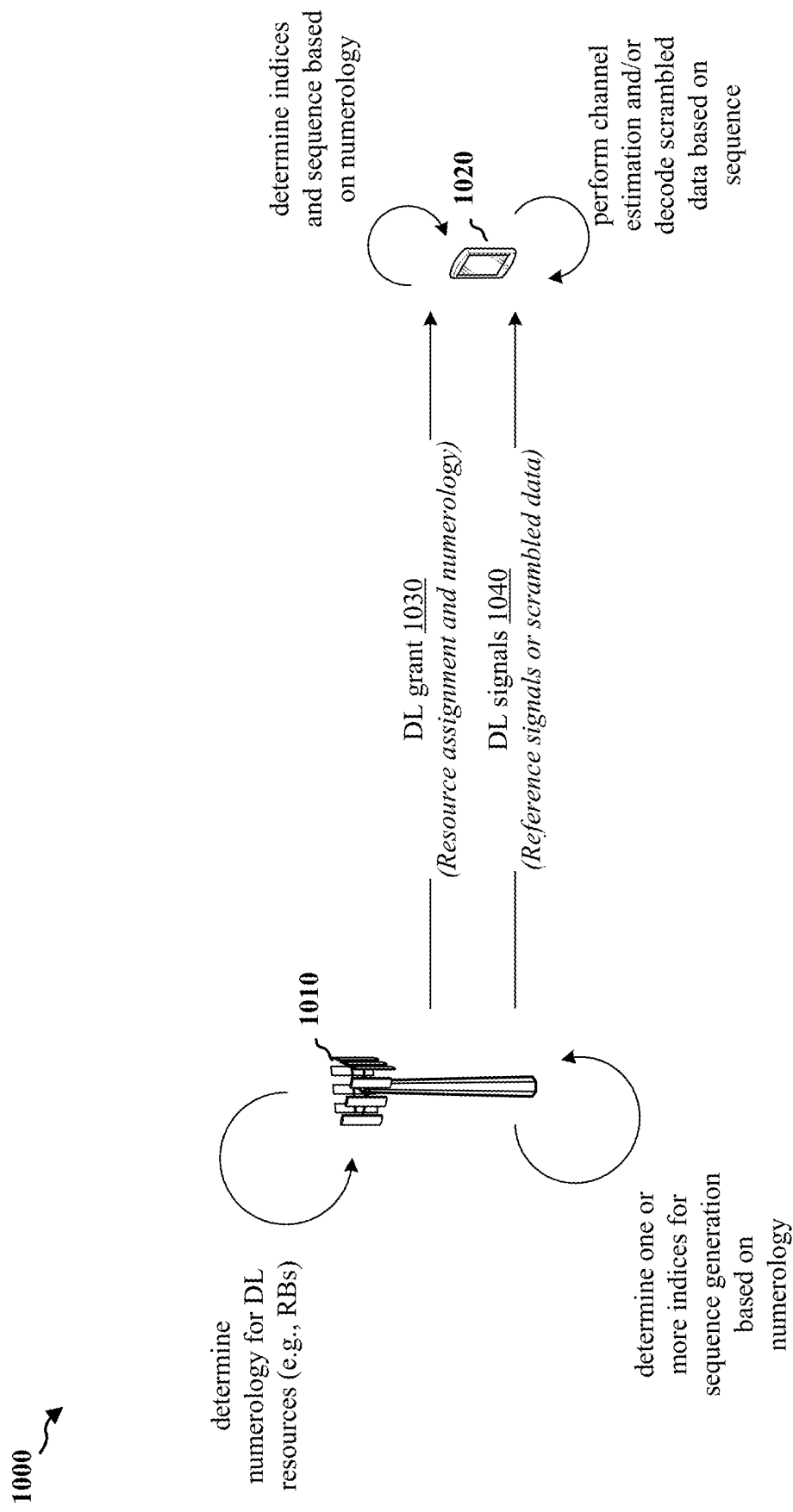
FIG. 10 illustrates a diagram of a first method of sequence generation with mixed numerologies.

FIG. 10 illustrates a diagram 1000 of a first method of sequence generation with mixed numerologies. The diagram 1000 illustrates communication between a base station 1010 and a UE 1020. In the example illustrated in the diagram 1000 the communication between the base station 1010 and the UE 1020 is a downlink (DL) communication. Referring to FIG. 10, the base station 1010 may determine a numerology associated with a set of RBs allocated for downlink transmission. For example, the base station 1010 may allocate a set of resource blocks with numerologies as shown in the fourth column of FIG. 5 (or in any other figure), in which some resource blocks have 2f numerology and other resource blocks have f numerology. Other numerology combinations may also be used. The numerology may indicate the subcarrier spacing and/or symbol duration associated with the RB. In an aspect, the symbol duration may be 1/subcarrier spacing.

In an aspect, the base station 1010 may have information to transmit to the UE 1020. The information may be one or more reference signals (e.g., a DM-RS, CSI-RS, or MRS) and/or data scrambled by a scrambling code. The reference signals and the scrambling code may be based on a sequence (or reference sequence), which may be function of an RB index, a symbol index, a frequency subcarrier index, and/or a symbol index of the DL resource on which the reference signal or data is to be transmitted.

The base station 1010 may allocate an RB to itself for DL transmission. The base station 1010 may determine the RB index for the RB using one of the methods, techniques, or protocols discussed with respect to FIGS. 5-9. In one configuration, referring to FIG. 5, the base station 1010 may determine to allocate resources with numerologies in accordance with the fourth column of FIG. 5. The base station may determine the RB index of RB 550 by matching a first RB location of RB 550 with the RB location of a corresponding RB 560 in a reference time-frequency grid in which all of the RBs have the 2f numerology. In this example, the RB index of RB 550 is 4. In another configuration, referring to FIG. 7, if the RBs do not match exactly with a corresponding RB in a reference time-frequency grid, the base station 1010 may determine the RB index of RB 750 by finding the closest corresponding RB (e.g., the RB 760 or the RB 770). In an aspect, the RB index may be assigned according to the fourth column of any of FIGS. 5-9.

In another configuration, referring to FIG. 8, the base station 1010 may determine to allocate resources with numerologies in accordance with the fourth column of FIG. 8. The base station may determine the RB index of RB 850 by matching a first RB location of RB 850 with the RB location of one or more corresponding RBs 860 in a reference time-frequency grid in which all of the RBs have numerology with a subcarrier spacing that is less than or equal to the subcarrier spacing of the RB 860. In this example, the base station 1010 may select RB indices 0 or 1. The base station 1010 may choose the RB index of the lowest frequency RB, and select RB index 0.

In another configuration, the sequence may also be based on a symbol index, a frequency subcarrier index, and/or a symbol index. For example, when a reference signal or data is to be transmitted in a particular DL resource (e.g., a resource element) associated with a symbol and frequency tone, the base station 1010 may determine the symbol index, frequency subcarrier index, and/or the symbol index associated with the resource. In one aspect, the base station 1010 may determine the symbol index of the resource by matching the symbol location of the resource with another symbol location of a corresponding symbol in a reference time-frequency grid in which all symbols have a 2f numerology. In another aspect, the symbol locations of the resource may not match perfectly with the symbol locations of the reference time-frequency grid due to a timing offset (e.g., resulting from different cyclic prefix values or a different number of cyclic prefixes). In this instance, the base station 1010 may select a closest corresponding symbol location. The closest corresponding symbol location may be that of a corresponding symbol that overlaps in time with the symbol associated with the resource but has a first starting symbol that precedes the first starting symbol of the symbol associated with the resource. Alternatively, the closest corresponding symbol location may be that of the corresponding symbol that has a first starting symbol that follows the first starting symbol of the symbol associated with the resource.

As illustrated in FIG. 10, a UE 1020 may be configured to receive an indication of assigned resources for communicating with a base station 1010, e.g., a DL communication. The UE 1020 may determine a numerology comprising at least one of a subcarrier spacing or a symbol duration associated with the assigned resources and determining one or more indices for the assigned resources based on the numerology. The UE 1020 may generate a sequence based on the one or more indices and communicate with the base station 1010 based on the sequence.

As illustrated in FIG. 10, the indication may include a downlink assignment. Communicating with the base station 1010 may include at least one of performing channel estimation or decoding scrambled data based on the sequence.

In an aspect, receiving information indicating the numerology from the base station 1010. The information may be received in an MIB, a SIB, or in an RRC signaling.

In an aspect, determining the numerology may include determining a first numerology associated with first assigned resources and determining a second numerology associated with second assigned resources, and wherein the first and second numerologies are different.

In an aspect, determining the numerology may include determining plurality of reference numerologies for the assigned resources, and wherein determining the one or more indices comprises comparing the portions of the assigned resources to corresponding reference numerologies in the plurality of numerologies.

In an aspect, determining the one or more indices for the assigned resources may include one or more of: determining an RB index by matching a first RB location of a first RB associated with the assigned resources with a second RB location of a corresponding reference numerology, wherein the RB index is based on the second RB location within the corresponding reference numerology, determining a symbol index by matching a first symbol location of a first symbol associated with the assigned resources with a second symbol location of a corresponding symbol in a corresponding reference numerology, wherein the symbol index is based on the second symbol location within the corresponding reference numerology, or determining a frequency subcarrier index by matching a first frequency subcarrier location associated with the assigned resources with a second frequency subcarrier location in a corresponding reference numerology, wherein the frequency subcarrier index is based on the second frequency subcarrier location within the corresponding reference numerology.

In an aspect, determining the numerology may include determining a subcarrier spacing and symbol duration associated with each of a plurality of UL resources or DL resources in the assigned resources, wherein the plurality of UL resources or DL resources comprises at least two different subcarrier spacings or symbol durations and determining an index for each UL resource or each DL resource of the plurality of UL.

Figure 11:
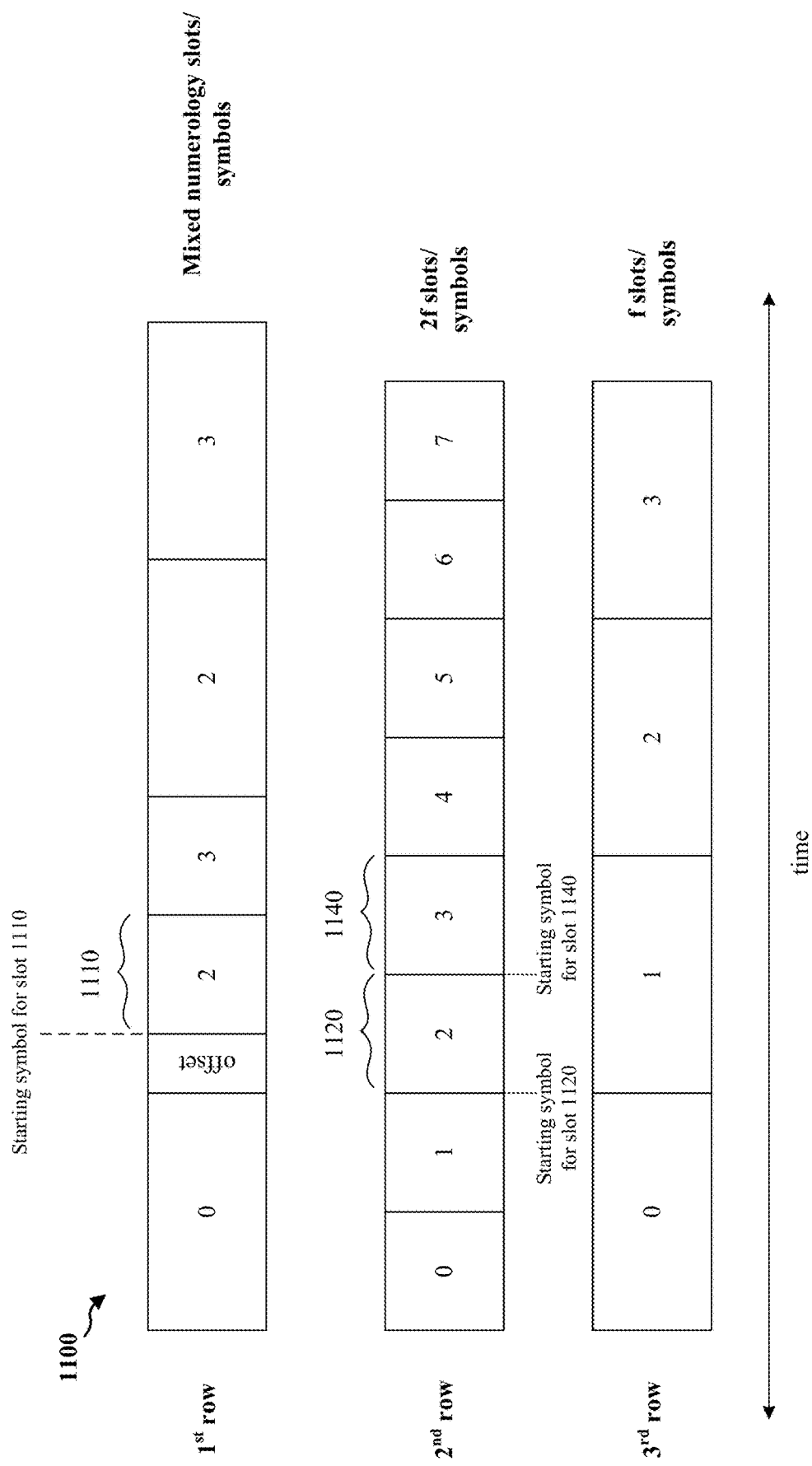
FIG. 11 illustrates a diagram of a first method for selecting a closest corresponding symbol location.

FIG. 11 illustrates a diagram 1100 of a method for selecting a closest corresponding symbol location. For example, to determine the symbol index for resource within symbol 1110 having a 2f numerology, a device may attempt to match the symbol 1110 with a corresponding symbol in a reference time-frequency grid that includes only symbols with 2f numerologies. Unlike the first symbol of the first row with RB index 0, which matches exactly with the first symbol with RB index 0 in the third row, symbol 1110 does not match perfectly with symbols 1120, 1140 in the second row. The device may determine the closest corresponding symbol, which may be either the symbol 1120 or the symbol 1140. The device may select the symbol 1120 if the closet corresponding symbol is a symbol that overlaps in time with the symbol 1110 but has a first starting symbol that precedes the first starting symbol of the symbol 1110. Alternatively, the device may selection the symbol 1140 if the closest corresponding symbol is a symbol that overlaps in time with the symbol 1110 but has a first starting symbol that follows the first starting symbol of the symbol 1110.

In another aspect, the base station 1010 may determine utilize a numerology with a smallest subcarrier spacing to determine the symbol index. The base station 1010 may determine the symbol location of the resource by matching the symbol location of the resource with a symbol location of one or more corresponding symbols in a reference time-frequency grid in which all symbols have numerology that is less than or equal to the numeral of the symbol associated with the resource. In some instances, the symbol locations of the resource may not match perfectly with the symbol locations of the reference time-frequency grid due the different numerologies. The closest corresponding symbol location may be that of a corresponding symbol that overlaps in time with the symbol associated with the resource but has an earliest starting symbol among the starting symbols of the other corresponding symbol candidates. Alternatively, the closest corresponding symbol location may be that of the corresponding symbol that has a first starting symbol that is last among starting symbols of the one or more corresponding symbols.

Figure 12:
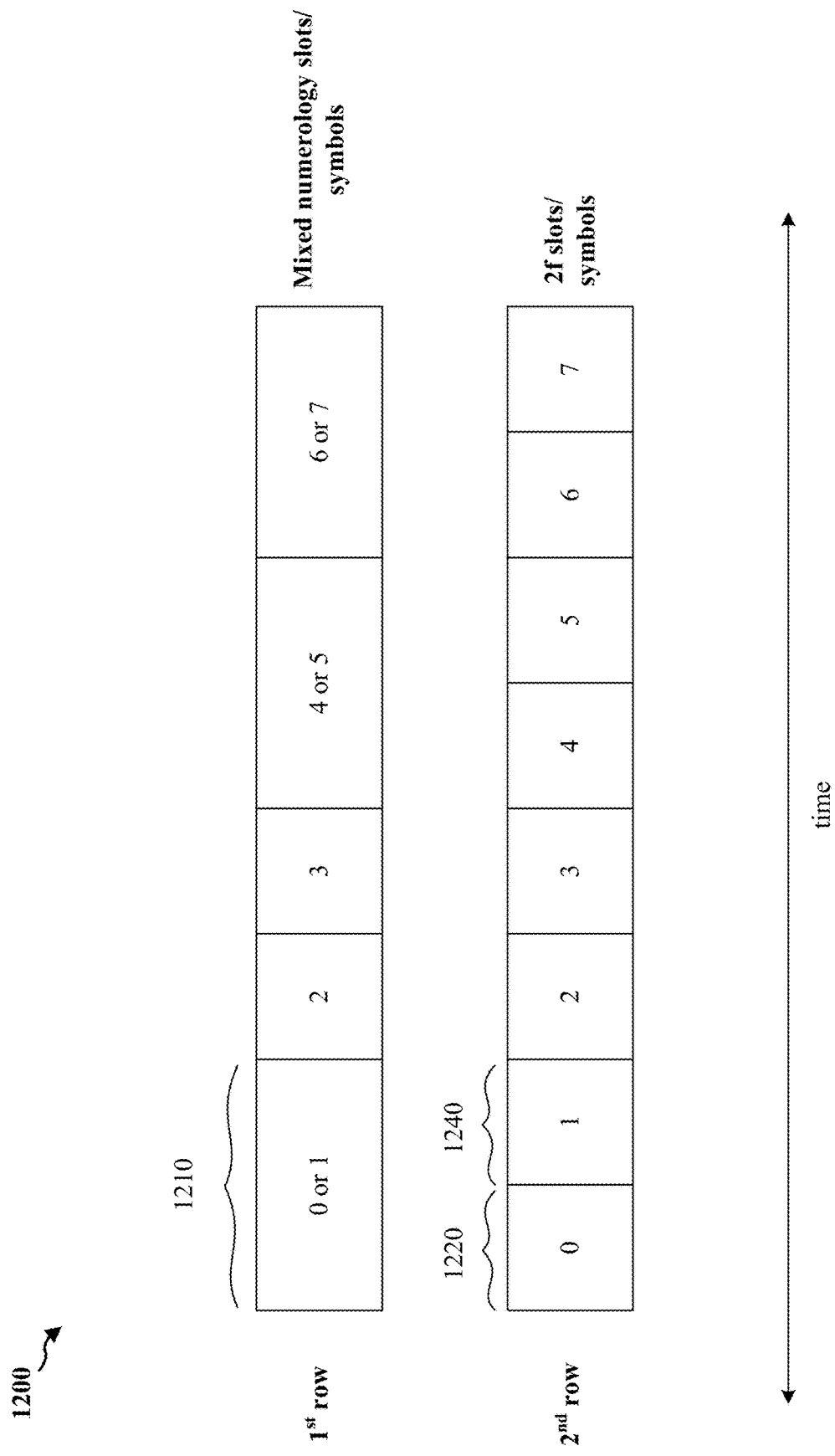
FIG. 12 illustrates a diagram of a method for selecting a symbol index.

FIG. 12 illustrates a diagram 1200 of a method for selecting a symbol index. For example, to determine the symbol index for resource within symbol 1210 having a f numerology, a device may determine that symbols 1220, 1240 are corresponding symbols in a reference time-frequency grid with 2f numerology. In this example, the symbol index for symbol 1210 may be either 0 or 1. A device may select symbol index 0 if the device chooses the corresponding RB with the earliest starting symbol, or the device may select symbol index 1 if the device chooses the corresponding RB with the latest starting symbol. Symbol index options are also provided for other symbols in the first row of FIG. 12 based corresponding sets of symbols in the second row.

In another configuration, referring to FIG. 9, the base station 1010 may determine to allocate resources with numerologies in accordance with the fourth column of FIG. 9. As discussed above, in some configurations, as provided in the fourth column of FIG. 9, mixed numerologies may be utilized. For example, a set of symbols 940 may have 2 symbols or another number of symbols. Most of the RBs associated with the set of symbols 940 may have a 2f numerology except that two of the RBs may have an f numerology. As shown in FIG. 9, RB indices 0-8 may be determined in a counting fashion.

Referring back to FIG. 10, the base station 1010 may determine the frequency subcarrier index of the resource by matching the frequency subcarrier location of the resource with a frequency subcarrier location of a corresponding frequency subcarrier in a reference RB having the 2f numerology. The base station 1010 may determine the symbol index of the resource by matching the symbol location of the resource with a symbol location of a corresponding symbol in a reference symbol that has the 2f numerology.

The base station 1010 may indicate the DL resource allocated to the UE 1020 in a DL grant 1030. The DL grant 1030 may be an indication of assigned resources. The DL grant 1030 may be transmitted via broadcast or unicast to the UE 1020. In an aspect, the DL grant 1030 may indicate the resource assignment for the DL resource and the numerology associated with the DL resource. For example, the DL grant may include a series of bits that convey time/frequency resources, RBs using the time frequency resources, and the numerology (e.g., time/frequency resources used by the RBs.)

After determining at least one of the RB index, symbol index, frequency subcarrier index, and/or symbol index associated with the DL resource, the base station 1010 may generate the sequence based on one or more of the indices. The sequence may be a series of bits used to convey one or more of the RB index, symbol index, frequency subcarrier index, and/or symbol index associated with the DL resource. The base station 1010 may transmit a signal 1040 to the UE 1020 based on the generated sequence. In one configuration, the sequence may be a reference signal (e.g., DM-RS, CSI-RS, or MRS), and the sequence may be transmitted in the signal 1040. In another configuration, the sequence may be a scrambling code identifying the base station 1010. When the base station has data for transmission, the base station 1010 may modulate the data onto modulation symbols and scramble the modulated data using the scrambling code. The scrambled and modulated data may then be transmitted in the signal 1040.

The UE 1020 may receive the DL grant 1030 containing the resource assignment for the DL resource. The UE 1020 may determine the RB index, the symbol index, the frequency subcarrier index, and/or the symbol index associated with the DL resource in a manner similar to that described with respect to the base station 1010. For example, the DL grant may include a series of bits that convey time/frequency resources, RBs using the time frequency resources, and the numerology (e.g., time/frequency resources used by the RBs.) Based on one or more of the determined indices, the UE 1020 may generate a sequence using the methods, protocols, and techniques as described with respect to the way in which the base station 1010 generated the sequence associated with the signal 1040. When the UE 1020 receives the signal 1040, the UE 1020 may utilize the sequence. In one configuration, if the signal 1040 includes a reference signal, then the UE 1020 may perform channel estimation based on the received signal 1040 and the generated sequence. In another configuration, if the signal 1040 includes data scrambled based on a scrambling code, then the UE 1020 may generate the scrambling code using the sequence, and decode the data in the signal 1040 based on the generated scrambling code.

Figure 13:
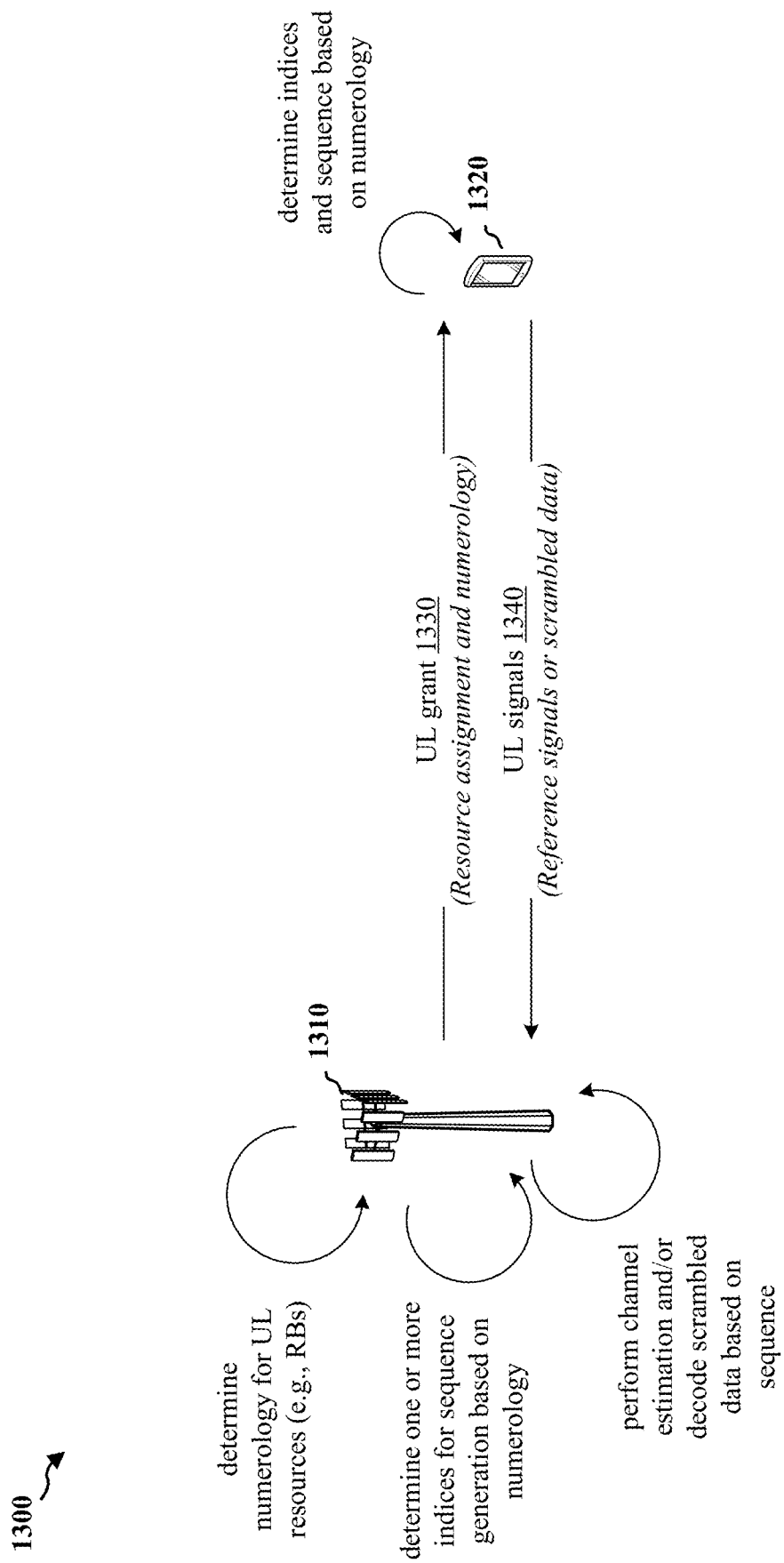
FIG. 13 illustrates a diagram of a second method of sequence generation with mixed numerologies.

FIG. 13 illustrates a diagram 1300 of a second method of sequence generation with mixed numerologies. The diagram 1300 illustrates communication between a base station 1310 and a UE 1320. In the example illustrated in the diagram 1300 the communication between the base station 1310 and the UE 1320 is an uplink (UL) communication. Referring to FIG. 13, a base station 1310 may determine a numerology associated with a set of RBs allocated for uplink transmission. For example, the base station 1310 may determine a numerology for a set of resource blocks as shown in the fourth column of FIG. 5, in which some resource blocks have 2f numerology and other resource blocks have f numerology. The numerology may indicate the subcarrier spacing and/or symbol duration associated the RB.

The base station 1310 may allocate UL resources (e.g., one of the RBs as shown in the fourth column of FIG. 5) to the UE 1320 and indicate the resource assignment to the UE 1320 in an UL grant 1330. The UL grant 1330 may be an indication of assigned resources. The UL grant 1330 may be transmitted via broadcast or unicast to the UE 1320. In an aspect, the UL grant 1330 may indicate the resource assignment for the UL resource and the numerology associated with the UL resource.

In an aspect, the UE 1320 may have information to transmit to the base station 1310. The information may be reference signals (e.g., a DM-RS, SRS, or MRS) and/or data scrambled by a scrambling code. The reference signals and the scrambling code may be based on a sequence, which may be function of an RB index, a symbol index, a frequency subcarrier index, and/or a symbol index of the UL resource on which the reference signal or data is to be transmitted.

The UE 1320 may determine the RB index of the UL resource using one of the methods, techniques, or protocols discussed with respect to FIGS. 5-9. In one configuration, referring to FIG. 5, the UE 1320 may receive a resource allocation provided in the fourth column of FIG. 5 and determine the RB index of the resource. For example, if the UE 1320 is allocated the RB 550, then the UE 1320 may determine the RB index of RB 550 by matching a first RB location of RB 550 with the RB location of a corresponding RB 560 in a reference time-frequency grid in which all of the RBs have the 2f numerology. In this example, the RB index of RB 550 is 4. In another configuration, referring to FIG. 7, if the RBs do not match exactly with a corresponding RB in a reference time-frequency grid, the UE 1320 may determine the RB index of RB 750 by finding the closest corresponding RB (e.g., the RB 760 or the RB 770).

In another configuration, referring to FIG. 8, the UE 1320 may receive a resource allocation from the fourth column of FIG. 8. For example, if allocated the RB 850, the UE 1320 may determine the RB index of the RB 850 by matching a first RB location of RB 850 with the RB location of one or more corresponding RBs 860 in a reference time-frequency grid in which all of the RBs have numerology with a subcarrier spacing that is less than or equal to the subcarrier spacing of the RB 860. In this example, the UE 1320 may select RB indices 0 or 1. The UE 1320 may choose the RB index of the lowest frequency RB, and select RB index 0.

In another configuration, the sequence may be based on a symbol index, a frequency subcarrier index, and/or a symbol index. For example, reference signal or data is to be transmitted in a particular UL resource (e.g., a resource element) associated with a symbol and frequency subcarrier, the UE 1320 may determine the symbol index, frequency subcarrier index, and/or the symbol index associated with the resource. In an aspect, the UE 1320 may determine the symbol location of the resource by matching the symbol location of the resource with another symbol location of a corresponding symbol in a reference time-frequency grid in which all symbols have a 2f numerology. In another aspect, the symbol location of the resource may not match perfectly with the symbol locations of the reference time-frequency grid due to a timing offset (e.g., resulting from different cyclic prefix values or a different number of cyclic prefixes). In this instance, the UE 1320 may select a closest corresponding symbol location. The closest corresponding symbol location may be that of a corresponding symbol that overlaps in time with the symbol associated with the resource but has a first starting symbol that precedes the first starting symbol of the symbol associated with the resource. Alternatively, the closest corresponding symbol location may be that of the corresponding symbol that has a first starting symbol that follows the first starting symbol of the symbol associated with the resource. As previously discussed, FIG. 11 and the corresponding disclosure describes the procedure for selecting the closest corresponding symbol location.

In another aspect, the UE 1320 may determine the symbol location of the resource by matching the symbol location of the resource with another symbol location of one or more corresponding symbols in a reference time-frequency grid in which all symbols have numerology that is less than or equal to the numeral of the symbol associated with the resource. In some instances, the symbol locations of the resource may not match perfectly with the symbol locations of the reference time-frequency grid due the different numerologies. The closest corresponding symbol location may be that of a corresponding symbol that overlaps in time with the symbol associated with the resource but has an earliest starting symbol among the starting symbols of the other corresponding symbol candidates. Alternatively, the closest corresponding symbol location may be that of the corresponding symbol that has a first starting symbol that is last among starting symbols of the one or more corresponding symbols. As previously discussed, FIG. 12 and the corresponding disclosure describe methods for selecting a symbol index.

In another configuration, referring to FIG. 9, the UE 1320 may determine to compute indices for resources with mixed numerologies in accordance with the fourth column of FIG. 9.

Referring to FIG. 13, the UE 1320 may determine the frequency subcarrier index of the resource by matching the frequency subcarrier location of the resource with a frequency subcarrier location of a corresponding frequency subcarrier in a reference RB having the 2f numerology. The UE 1320 may determine the symbol index of the resource by matching the symbol location of the resource with a symbol location of a corresponding symbol in a reference symbol that has the 2f numerology.

After determining at least one of the RB index, symbol index, frequency subcarrier index, and/or symbol index associated with the UL resource, the UE 1320 may generate the sequence based on one or more of the indices. For example, the sequence may be a series of bits conveying one or more of the RB index, symbol index, frequency subcarrier index, and/or symbol index associated with the UL resource. The UE 1320 may transmit a signal 1340 to the base station 1310 based on the generated sequence. In one configuration, the sequence be a reference signal (e.g., DM-RS, SRS, or MRS), and the sequence may be transmitted in the signal 1340. In another configuration, the sequence may be a scrambling code identifying the UE 1320. When the UE 1320 has data for transmission, the UE 1320 may modulate the data onto modulation symbols and scramble the modulated data using the scrambling code. The scrambled and modulated data may then be transmitted in the signal 1340.

Referring to FIG. 13, the base station 1310 may determine the RB index, the symbol index, the frequency subcarrier index, and/or the symbol index associated with the UL resource assigned to the UE 1320. Based on one or more of the determined indices, the base station 1310 may generate a sequence using the methods, protocols, and techniques as described with respect to the way in which the UE 1320 (or the base station 1010) generated the sequence associated with the signal 1340. When the base station 1310 receives the signal 1340, the base station 1310 may utilize the sequence. In one configuration, if the signal 1340 includes a reference signal, then the base station 1310 may perform channel estimation based on the received signal 1340 and the generated sequence. In another configuration, if the signal 1340 includes data scrambled based on a scrambling code, then the base station 1310 may generate the scrambling code using the sequence, and decode the data in the signal 1340 based on the generated scrambling code. The scrambling code may be based on a sequence (or reference sequence), which may be function of an RB index, a symbol index, a frequency subcarrier index, and/or a symbol index of the DL resource on which the reference signal or data is to be transmitted.

In an aspect, the numerology of the assigned resources may be indicated in a MIB or a SIB. For example, data indicating which numerology is used may be included in the MIB or SIB, e.g., in an example with four different numerologies, 2 bits of the MIB or SIB may be used to indicating which numerology is used. In another aspect, base stations and/or UEs may be assigned resources (e.g., RBs) of different numerologies.

As illustrated in FIG. 13, a UE 1320 may be configured to receive an indication of assigned resources for communicating with a base station 1310, e.g., a UL communication. The UE 1320 may determine a numerology comprising at least one of a subcarrier spacing or a symbol duration associated with the assigned resources and determining one or more indices for the assigned resources based on the numerology. The UE 1320 may generate a sequence based on the one or more indices and communicate with the base station 1310 based on the sequence.

As illustrated in FIG. 13, the indication may include an uplink grant. Communicating with the base station 1310 may include at least one of transmitting a reference signal in an uplink transmission or scrambling data for the uplink transmission based on the sequence. The uplink transmission nay be based on the uplink grant.

In an aspect, receiving information indicating the numerology from the base station 1310. The information may be received in an MIB, a SIB, or in an RRC signaling.

In an aspect, determining the numerology may include determining a first numerology associated with first assigned resources and determining a second numerology associated with second assigned resources, and wherein the first and second numerologies are different.

In an aspect, determining the numerology may include determining plurality of reference numerologies for the assigned resources, and wherein determining the one or more indices comprises comparing the portions of the assigned resources to corresponding reference numerologies in the plurality of numerologies.

In an aspect, determining the one or more indices for the assigned resources may include one or more of: determining an RB index by matching a first RB location of a first RB associated with the assigned resources with a second RB location of a corresponding reference numerology, wherein the RB index is based on the second RB location within the corresponding reference numerology, determining a symbol index by matching a first symbol location of a first symbol associated with the assigned resources with a second symbol location of a corresponding symbol in a corresponding reference numerology, wherein the symbol index is based on the second symbol location within the corresponding reference numerology, or determining a frequency subcarrier index by matching a first frequency subcarrier location associated with the assigned resources with a second frequency subcarrier location in a corresponding reference numerology, wherein the frequency subcarrier index is based on the second frequency subcarrier location within the corresponding reference numerology.

In an aspect, the determining the one or more indices for the assigned resources may include one or more of matching a time-frequency resources with an indexed time-frequency grid with the numerology and choosing a closest matching indices.

In an aspect, determining the numerology may include determining a subcarrier spacing and symbol duration associated with each of a plurality of UL resources or DL resources in the assigned resources, wherein the plurality of UL resources or DL resources comprises at least two different subcarrier spacings or symbol durations and determining an index for each UL resource or each DL resource of the plurality of UL.

Figure 14:
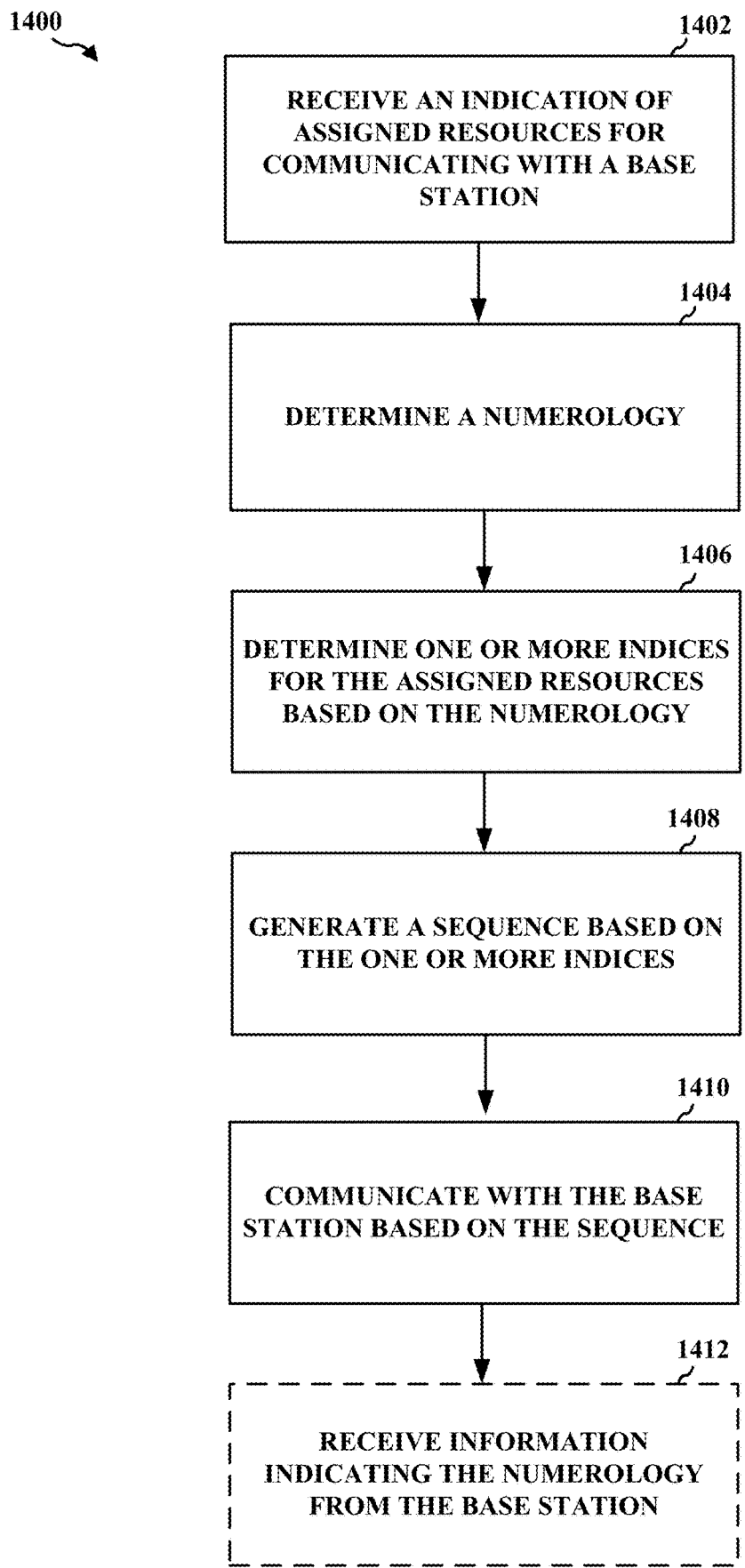
FIG. 14 is a flowchart of a method of wireless communication.

FIG. 14 is a flowchart 1400 of a method of wireless communication. The method may be performed by a UE (e.g., the UE 104, 350, 1020, 1320, the apparatus 1502/1502'). At 1402, the UE may receive an indication of assigned resources for communicating with a base station. For example, the UE (e.g., the UE 104, 350, 1020, 1320, the apparatus 1502/1502') may receive an indication of assigned resources for communicating with a base station. In an aspect, the indication may include a downlink assignment. In an aspect, the indication may include an uplink grant. The information may be received in an MIB, a SIB, or in RRC signaling. The information may be a mapping of bits to various numerologies. For example, if specific individual numerologies are used, a series of bits may map to the individual numerologies, e.g., 2 bits may map to 4 numerologies. Mixed numerologies may use a more complicated mapping, e.g., bits may be used to indicate a number of RBs and the sizes in time and frequency for the RBs.

At 1404, the UE may determine a numerology. The numerology may include at least one of a subcarrier spacing or a symbol duration associated with the assigned resources. In an aspect, the numerology may be associated with the resource for transmitting a signal. For example, the UE (e.g., the UE 104, 350, 1020, 1320, the apparatus 1502/1502') may determine a numerology.

In an aspect, determining the numerology may include determining a first numerology associated with first assigned resources and determining a second numerology associated with second assigned resources. The first and second numerologies may be different. In another aspect, determining the numerology may include determining a plurality of reference numerologies for the assigned resources.

In an aspect, determining the numerology may include determining a subcarrier spacing and symbol duration associated with each of a plurality of UL resources or DL resources in the assigned resources and wherein determining an index for each UL resource or each DL resource of the plurality of UL resources or DL resources is based upon a corresponding reference subcarrier spacing and a corresponding reference symbol duration for each UL resource or each DL resource. The plurality of UL resources or DL resources may include at least two different subcarrier spacings or symbol durations.

A numerology may be associated with time and/or frequency resource used for RBs to transmit a signal.

In an aspect, the numerology may correspond to a subcarrier spacing in the resource.

For example, the numerology may indicate a size of an RB in time and frequency.

In an aspect, the numerology may be determined based on the received information. For example, bits in the received information may indicate a number of RBs and/or time/frequency resources for each of the RBs.

At 1406, the UE may determine one or more indices for the assigned resources based on the numerology. For example, the UE (e.g., the UE 104, 350, 1020, 1320, the apparatus 1502/1502') may determine the sequence based on the determined numerology. In an aspect, determining the one or more indices may include comparing portions of the assigned resources to corresponding reference numerologies in the plurality of numerologies.

In another aspect, determining the one or more indices for the assigned resources may include one or more of the following. For example, determining the one or more indices for the assigned resources may include determining a resource block (RB) index by matching a first RB location of a first RB associated with the assigned resources with a second RB location of a corresponding reference numerology, wherein the RB index is based on the second RB location within the corresponding reference numerology. Determining the one or more indices for the assigned resources may include determining a symbol index by matching a first symbol location of a first symbol associated with the assigned resources with a second symbol location of a corresponding reference numerology, wherein the symbol index is based on the second symbol location within the corresponding reference numerology. Determining the one or more indices for the assigned resources may include determining a frequency subcarrier index by matching a first frequency subcarrier location associated with the assigned resources with a second frequency subcarrier location in a corresponding reference numerology, wherein the frequency subcarrier index is based on the second frequency subcarrier location within the corresponding reference numerology. Determining the one or more indices for the assigned resources may include determining the one or more indices for the assigned resources comprises comparing the assigned resources with an indexed time-frequency grid having a reference numerology and choosing a closest match.

In an aspect, determining the at least one of the RB index, the symbol index, the frequency subcarrier index, or the symbol index may include performing one or more of: determining the RB index by matching a first RB location of a first RB associated with the resource with a second RB location of a corresponding RB in a reference time-frequency grid having the determined numerology. The RB index may be based on the second RB location within the reference time-frequency grid.

An aspect may determine the symbol index by matching a first symbol location of a first symbol associated with the resource with a second symbol location of a corresponding symbol in a reference time-frequency grid having the determined numerology. The symbol index may be based on the second symbol location within the reference time-frequency grid.

An aspect may determine the frequency subcarrier index by matching a first frequency subcarrier location associated with the resource with a second frequency subcarrier location of a corresponding frequency subcarrier in a reference RB having the determined numerology. The frequency subcarrier index may be based on the second frequency subcarrier location within the reference RB.

An aspect may determine the symbol index by matching a first symbol location associated with the resource with a second symbol location of a corresponding symbol in a reference symbol having the determined numerology. The symbol index may be based on the second symbol location within the reference symbol.

In an aspect, the second RB location may be a closest corresponding RB location to the first RB location. The second symbol location may be a closest corresponding symbol location to the first symbol location. The second frequency subcarrier location may be a closest corresponding frequency subcarrier location to the first frequency subcarrier location. In an aspect, the second symbol location may be a closest corresponding symbol location to the first symbol location.

In an aspect, the first RB may have a first starting frequency that is less than or equal to a second starting frequency of the corresponding RB. The first RB may have the first starting frequency that is greater than or equal to the second starting frequency of the corresponding RB.

In an aspect, the first symbol may have a first starting symbol that precedes or coincides with a second starting symbol of the corresponding symbol. The first symbol may have the first starting symbol that follows or coincides with the second starting frequency of the corresponding symbol.

In an aspect, determining the at least one of the RB index, the symbol index, the frequency subcarrier index, or the symbol index may include performing one or more of: determining the RB index by matching a first RB location of the resource with a set of RB locations of one or more corresponding RBs in a reference time-frequency grid having a second numerology. The second numerology may be associated with a first subcarrier spacing that is less than or equal to a second subcarrier spacing associated with the numerology. The RB index may be determined based on the set of RB locations.

An aspect may include determining the symbol index by matching a first symbol location of the resource with a set of symbol locations of one or more corresponding symbols in a reference time-frequency grid having a second numerology. The second numerology may be associated with a first subcarrier spacing that is less than or equal to a second subcarrier spacing associated with the numerology. The symbol index may be determined based on the set of symbol locations.

An aspect may include determining the frequency subcarrier index by matching a first frequency subcarrier location of the resource with a set of frequency subcarrier locations of one or more corresponding frequency subcarrier locations in a reference RB having a second numerology. The second numerology may be associated with a first subcarrier spacing that is less than or equal to a second subcarrier spacing associated with the numerology. The frequency subcarrier index may be determined based on the set of frequency subcarrier locations.

An aspect may include determining the symbol index by matching a first symbol location of the resource with a set of symbol locations of one or more corresponding symbols in a reference symbol having a second numerology. The second numerology may be associated with a first subcarrier spacing that is less than or equal to a second subcarrier spacing associated with the numerology. The symbol index may be determined based on the set of symbol locations.

In an aspect, the RB index may correspond to an index of a lowest frequency RB among the one or more corresponding RBs or may correspond to an index of a highest frequency RB among the one or more corresponding RBs.

In an aspect, the symbol index may correspond to an index of a symbol with an earliest starting symbol among the one or more corresponding symbols or may correspond to an index of a symbol with a latest starting symbol among the one or more corresponding symbols.

In an aspect, the determining the at least one of the RB index, the symbol index, the frequency subcarrier index, or the symbol index may include determining numerology information for a set of RBs. The RB index may be determined based on a location of an RB associated with the resource in relation to other RBs in the set of RBs and the numerology information for the set of RBs.

In an aspect, the reference signal may include one of a DM-RS, a SRS, or an MRS.

At 1408, the UE may generate a sequence based on the one or more indices. For example, the UE (e.g., the UE 104, 350, 1020, 1320, the apparatus 1502/1502') may generate a sequence based on the one or more indices. In an aspect, determining the sequence may include determining at least one of an RB index, a symbol index, a frequency subcarrier index, or a symbol index associated with the resource. Accordingly, an aspect may generate the sequence based on the at least one of the RB index, the symbol index, the frequency subcarrier index, or the symbol index associated with the resource. In an aspect, the sequence may be a reference signal. The signal may include the reference signal. In an aspect, the sequence may be a scrambling code.

At 1410, the UE may communicate with the base station based on the sequence. For example, the UE (e.g., the UE 104, 350, 1020, 1320, the apparatus 1502/1502') may communicate with the base station based on the sequence. In an aspect, communicating with the base station may include receiving a downlink transmission based on the downlink assignment and performing at least one of channel estimation based on the sequence or decoding scrambled data received in the downlink transmission based on the sequence. In another aspect, communicating with the base station may include at least one of transmitting a reference signal in an uplink transmission or scrambling data for the uplink transmission based on the sequence. The uplink transmission may be based on the uplink grant.

At 1412, optionally, the UE may receive information indicating the numerology from the base station. For example, the UE (e.g., the UE 104, 350, 1020, 1320, the apparatus 1502/1502') may receiving information indicating the numerology from the base station. In an aspect, the information is received in an MIB, a SIB, or in an RRC signaling.

Figure 15:
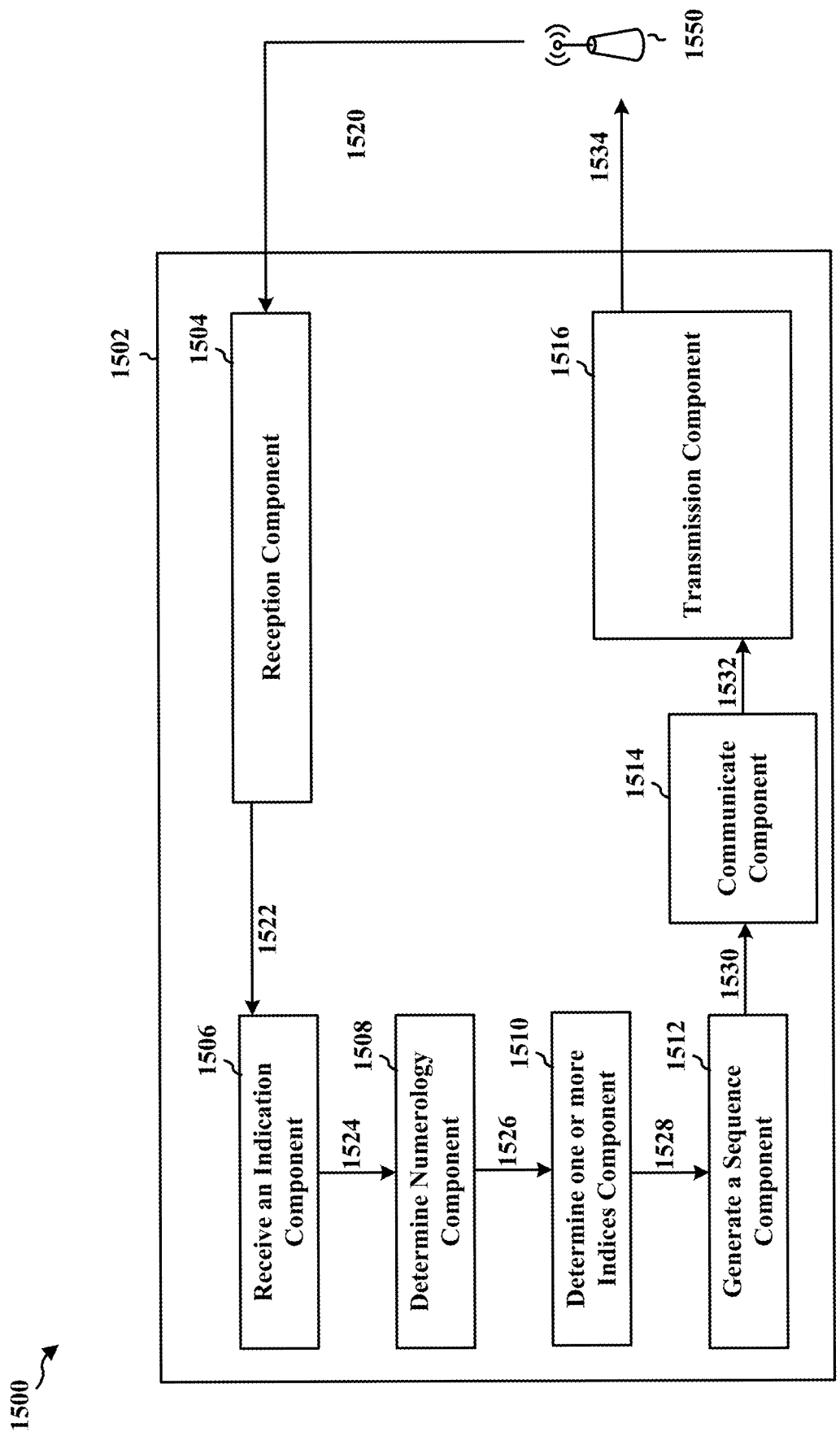
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus includes a component 1504 that receives signals, such as signals 1520 from a base station 1550. In an aspect, the component 1504 may receive signals 1520 and the signals 1520 received may include information indicating the numerology from the base station. For example, the information may be received in a signal 1520 that may be transmitted using MIB, a SIB, or RRC signaling. The apparatus includes a component 1506 that receives an indication 1522 of assigned resources for communicating with a base station 1550, e.g., from the base station 1550 (signal 1520) through the reception component 1504 (indication 1522). The apparatus includes a component 1508 that determines a numerology 1526 that may include at least one of a subcarrier spacing or a symbol duration associated with the assigned resources, e.g., received 1524 from the receive indication component 1506. The apparatus 1502 may also include a component 1510 that determines one or more indices 1528 for the assigned resources based on the numerology 1526. Additionally, the apparatus 1502 may include a component 1512 that generates a sequence 1530 based on the one or more indices 1528. The apparatus 1502 may include a component 1514 that communicates 1532 with the base station based on the sequence 1530, e.g., through the transmission component 1516, which may transmit signals 1534.

The apparatus 1502 may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
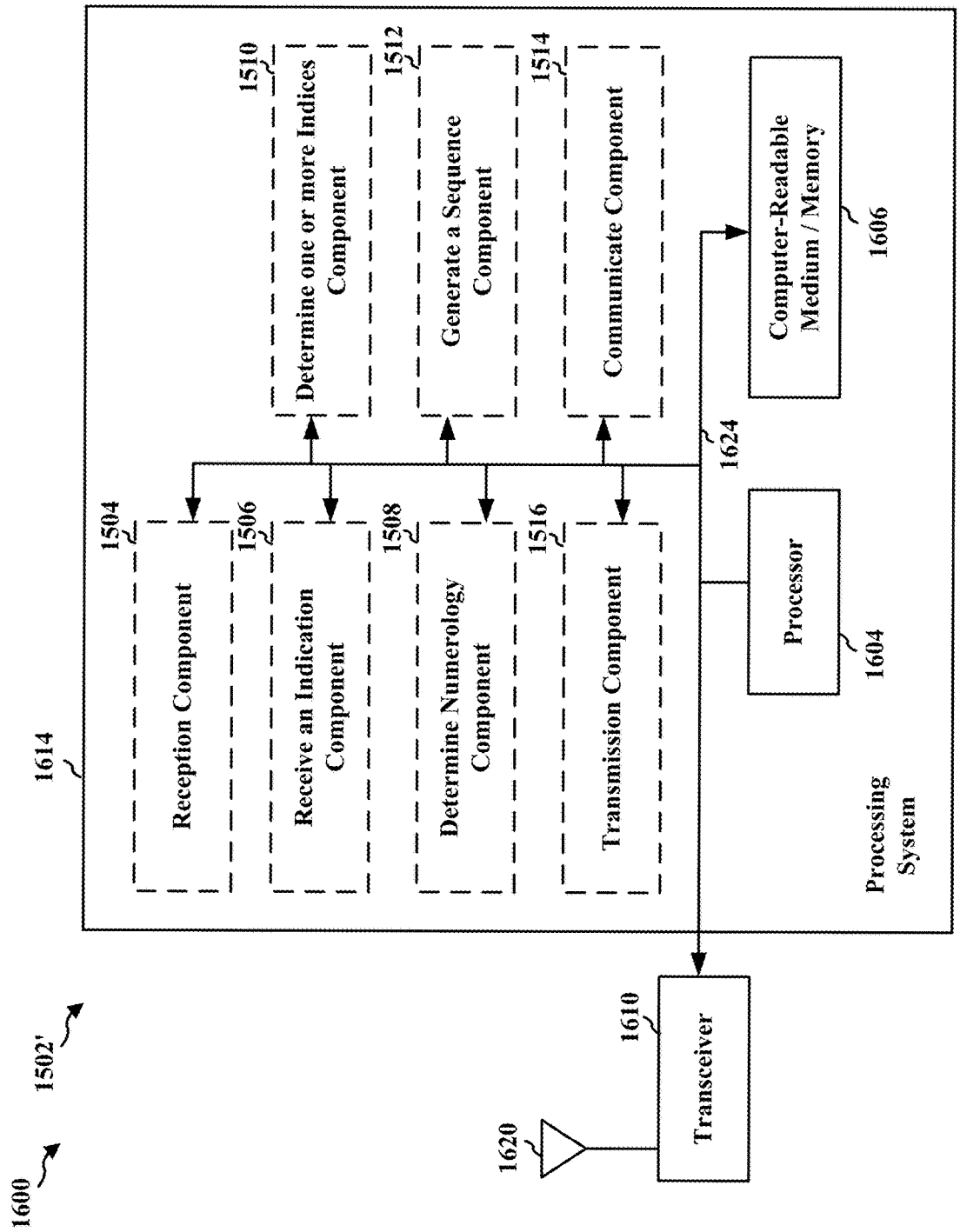
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception components 1504, may receive information indicating the numerology from the base station. The information may be received in am MIB, a SIB, or RRC signaling. In addition, the transceiver 1610 transmits information from the processing system 1614. The apparatus 1502/1502' for wireless communication includes a component 1504 for receiving. The component 1504 may receive information indicating the numerology from the base station or other signals. The apparatus 1502/1502' for wireless communication includes a component 1506 for receiving an indication of assigned resources for communicating with a base station, a component 1508 for determining a numerology comprising at least one of a subcarrier spacing or a symbol duration associated with the assigned resources, a component 1510 for determining one or more indices for the assigned resources based on the numerology, a component 1512 for generating a sequence based on the one or more indices, and a component 1514 for communicating with the base station based on the sequence. The apparatus 1502/1502' for wireless communication also includes a component 1516 for transmitting signals. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving an indication of assigned resources for communicating with a base station, means for determining a numerology comprising at least one of a subcarrier spacing or a symbol duration associated with the assigned resources, means for determining one or more indices for the assigned resources based on the numerology, means for generating a sequence based on the one or more indices, and means for communicating with the base station based on the sequence. In an aspect, the apparatus 1502/1502' for wireless communication includes means for receiving information indicating the numerology from the base station.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
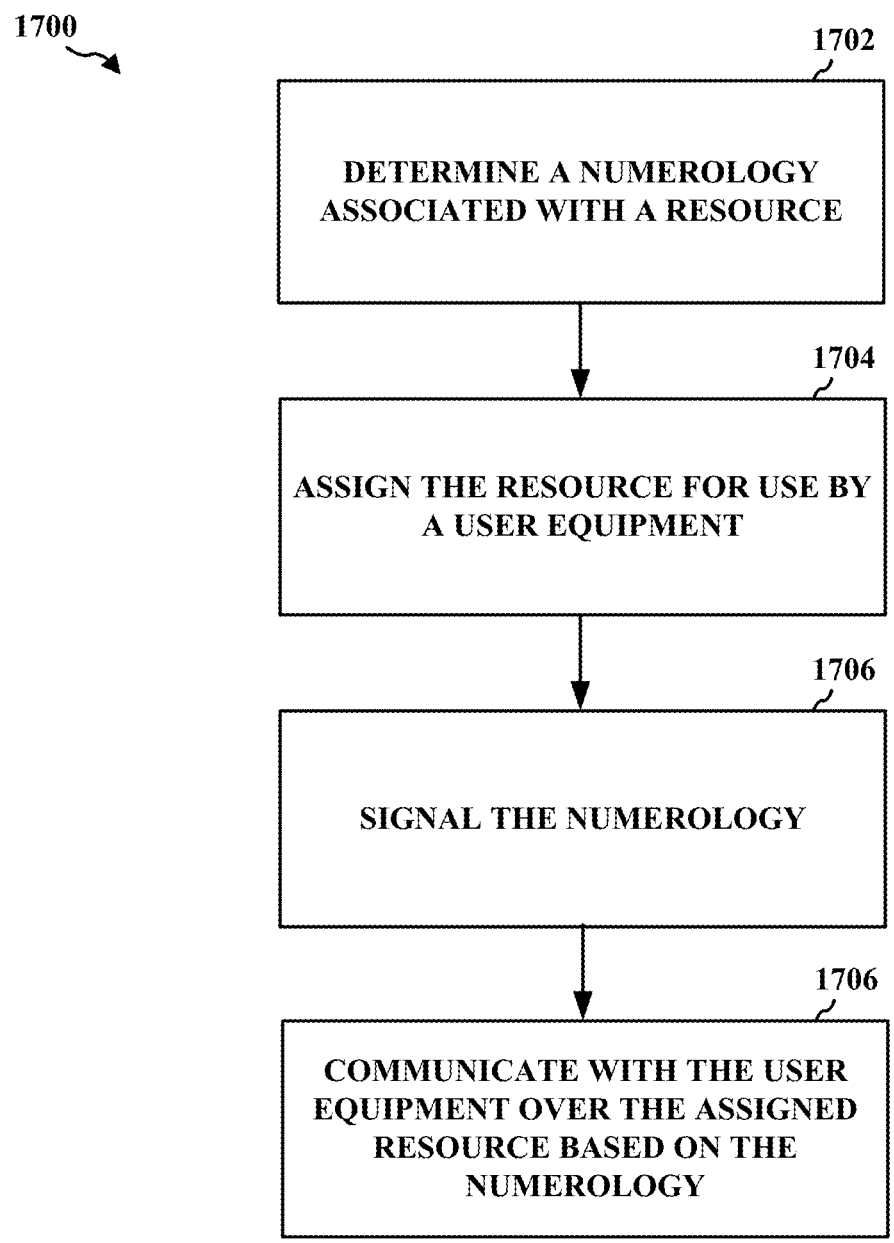
FIG. 17 is a flowchart of a method of wireless communication.

FIG. 17 is a flowchart 1700 of a method of wireless communication. The method may be performed by a base station (e.g., the base station 102, 180, 310, 1010, 1310, the apparatus 1802/1802'). At 1702, the base station may determine a numerology associated with a resource. For example, the base station (base station 102, 180, 310, 1010, 1310, the apparatus 1802/1802') may determine a numerology associated with a resource. In an aspect, the determining of the numerology associated with the resource may include determining a subcarrier spacing and symbol duration associated with each of a plurality of UL resources. The plurality of UL resources may include at least two different subcarrier spacings or symbol durations. The apparatus may determine indices for each of the plurality of UL resources based upon a corresponding subcarrier spacing and a corresponding symbol duration for each UL resource.

In an aspect, the plurality of UL resources may include a plurality of RBs of a system bandwidth. The determining the index may be performed for each RB in relation to the numerology associated with the corresponding subcarrier spacing and the corresponding symbol duration of each RB.

In an aspect, determining a numerology may include determining a first numerology for a first portion of the resource and a second numerology for a second portion of the resource At 1704, the base station may assign the resource for use by a user equipment. For example, the base station (base station 102, 180, 310, 1010, 1310, the apparatus 1802/1802') may assign the resource for use by a user equipment. For example, the base station may select a UE to assign a resource, select the resource for the selected UE, and assign the selected resource to the UE In an aspect, numerology may refer to parameters used to define a waveform transmission. The numerology parameters may include one or more of a sub-carrier spacing, a length of a cyclic prefix, a length of an OFDM symbol, a number of symbols contained in a Transmission Time Interval (TTI), and a duration of the TTI, e.g., in milliseconds. Accordingly, one or more of the MIB, SIB, RRC may include one or more of a sub-carrier spacing, a length of a cyclic prefix, a length of an OFDM symbol, a number of symbols contained in a TTI, and a duration of the TTI.

At 1706, the base station may signal the numerology. For example, the base station (base station 102, 180, 310, 1010, 1310, the apparatus 1802/1802') may signal the numerology. Signaling the numerology may include signaling at least one of a subcarrier spacing or a symbol duration associated with the resource. In an aspect, the numerology may be signaled in at least one of a MIB, a SIB, or RRC signaling. In an aspect, signaling the numerology may include signaling the first numerology and signaling the second numerology.

In other aspects, the base station may determine a second numerology associated with a second resource. For example, the base station (base station 102, 180, 310, 1010, 1310, the apparatus 1802/1802') may determine a second numerology associated with a second resource.

In an aspect, the base station may determine a sequence associated with the second resource based on the determined second numerology. For example, the base station (base station 102, 180, 310, 1010, 1310, the apparatus 1802/1802') may determine a sequence associated with the second resource based on the determined second numerology.

In an aspect, the determining the sequence may include determining at least one of an RB index, a symbol index, a frequency subcarrier index, or a symbol index associated with the resource and generating the sequence based on the at least one of the RB index, the symbol index, the frequency subcarrier index, or the symbol index associated with the resource.

In an aspect, the determining the at least one of the RB index, the symbol index, the frequency subcarrier index, or the symbol index may include performing one or more of: determining the RB index by matching a first RB location of a first RB associated with the resource with a second RB location of a corresponding RB in a reference time-frequency grid having the determined numerology. The RB index may be based on the second RB location within the reference time-frequency grid.

In an aspect, the determining the at least one of the RB index, the symbol index, the frequency subcarrier index, or the symbol index may include determining the symbol index by matching a first symbol location of a first symbol associated with the resource with a second symbol location of a corresponding symbol in a reference time-frequency grid having the determined numerology. The symbol index may be based on the second symbol location within the reference time-frequency grid.

In an aspect, the determining the at least one of the RB index, the symbol index, the frequency subcarrier index, or the symbol index may include determining the frequency subcarrier index by matching a first frequency subcarrier location associated with the resource with a second frequency subcarrier location of a corresponding frequency subcarrier in a reference RB having the determined numerology. The frequency subcarrier index may be based on the second frequency subcarrier location within the reference RB.

In an aspect, the determining the at least one of the RB index, the symbol index, the frequency subcarrier index, or the symbol index may include determining the symbol index by matching a first symbol location associated with the resource with a second symbol location of a corresponding symbol in a reference symbol having the determined numerology. the symbol index may be based on the second symbol location within the reference symbol.

In an aspect, the second RB location may be a closest corresponding RB location to the first RB location. The second symbol location may be a closest corresponding symbol location to the first symbol location. The second frequency subcarrier location may be a closest corresponding frequency subcarrier location to the first frequency subcarrier location, or wherein the second symbol location may be a closest corresponding symbol location to the first symbol location.

In an aspect, the first RB may have a first starting frequency that is less than or equal to a second starting frequency of the corresponding RB. The first RB may have the first starting frequency that is greater than or equal to the second starting frequency of the corresponding RB.

In an aspect, the first symbol may have a first starting symbol that precedes or coincides with a second starting symbol of the corresponding symbol. The first symbol may have the first starting symbol that follows or coincides with the second starting frequency of the corresponding symbol.

In an aspect, the determining the at least one of the RB index, the symbol index, the frequency subcarrier index, or the symbol index may include performing one or more of determining the RB index by matching a first RB location of the resource with a set of RB locations of one or more corresponding RBs in a reference time-frequency grid having a second numerology. The second numerology may be associated with a first subcarrier spacing that is less than or equal to a second subcarrier spacing associated with the numerology. The RB index may be determined based on the set of RB locations.

An aspect may include determining the symbol index by matching a first symbol location of the resource with a set of symbol locations of one or more corresponding symbols in a reference time-frequency grid having a second numerology. The second numerology may be associated with a first subcarrier spacing associated with the numerology. The symbol index may be determined based on the set of symbol locations.

An aspect may include determining the frequency subcarrier index by matching a first frequency subcarrier location of the resource with a set of frequency subcarrier locations of one or more corresponding frequency subcarriers in a reference RB having a second numerology. The second numerology may be associated with a first subcarrier spacing that is less than or equal to a second subcarrier spacing associated with the numerology. The frequency subcarrier index may be determined based on the set of frequency subcarrier locations.

An aspect may include determining the symbol index by matching a first symbol location of the resource with a set of symbol locations of one or more corresponding symbols in a reference symbol having a second numerology. The second numerology may be associated with a first subcarrier spacing that is less than or equal to a second subcarrier spacing associated with the numerology. The symbol index may be determined based on the set of symbol locations.

In an aspect, the RB index may correspond to an index of a lowest frequency RB among the one or more corresponding RBs or corresponds to an index of a highest frequency RB among the one or more corresponding RBs.

In an aspect, the symbol index may correspond to an index of a symbol with an earliest starting symbol among the one or more corresponding symbols or corresponds to an index of a symbol with a latest starting symbol among the one or more corresponding symbols.

In an aspect, the determining the at least one of the RB index, the symbol index, the frequency subcarrier index, or the symbol index may include determining numerology information for a set of RBs. The RB index may be determined based on a location of an RB associated with the resource in relation to other RBs in the set of RBs and the numerology information for the set of RBs.

In an aspect, the sequence is a reference signal. The second signal may include the reference signal. For example, the sequence may be used as a reference signal because the sequence may be known. The sequence/reference signal may be transmitted as part of the second signal.

In an aspect, the reference signal may include one of a DM-RS, a CSI-RS, or a MRS.

In an aspect, the sequence may be a scrambling code.

In other aspects, the base station may transmit a second signal based on the determined sequence. For example, the base station (base station 102, 180, 310, 1010, 1310, the apparatus 1802/1802') may transmit a second signal based on the determined sequence. The transmitting may further include scrambling information based on the scrambling code and transmitting the scrambled information in the second signal. In an aspect, determining the sequence may include determining at least one of an RB index, a symbol index, a frequency subcarrier index, or a symbol index associated with the resource and generating the sequence based on the at least one of the RB index, the symbol index, the frequency subcarrier index, or the symbol index associated with the resource.

Figure 18:
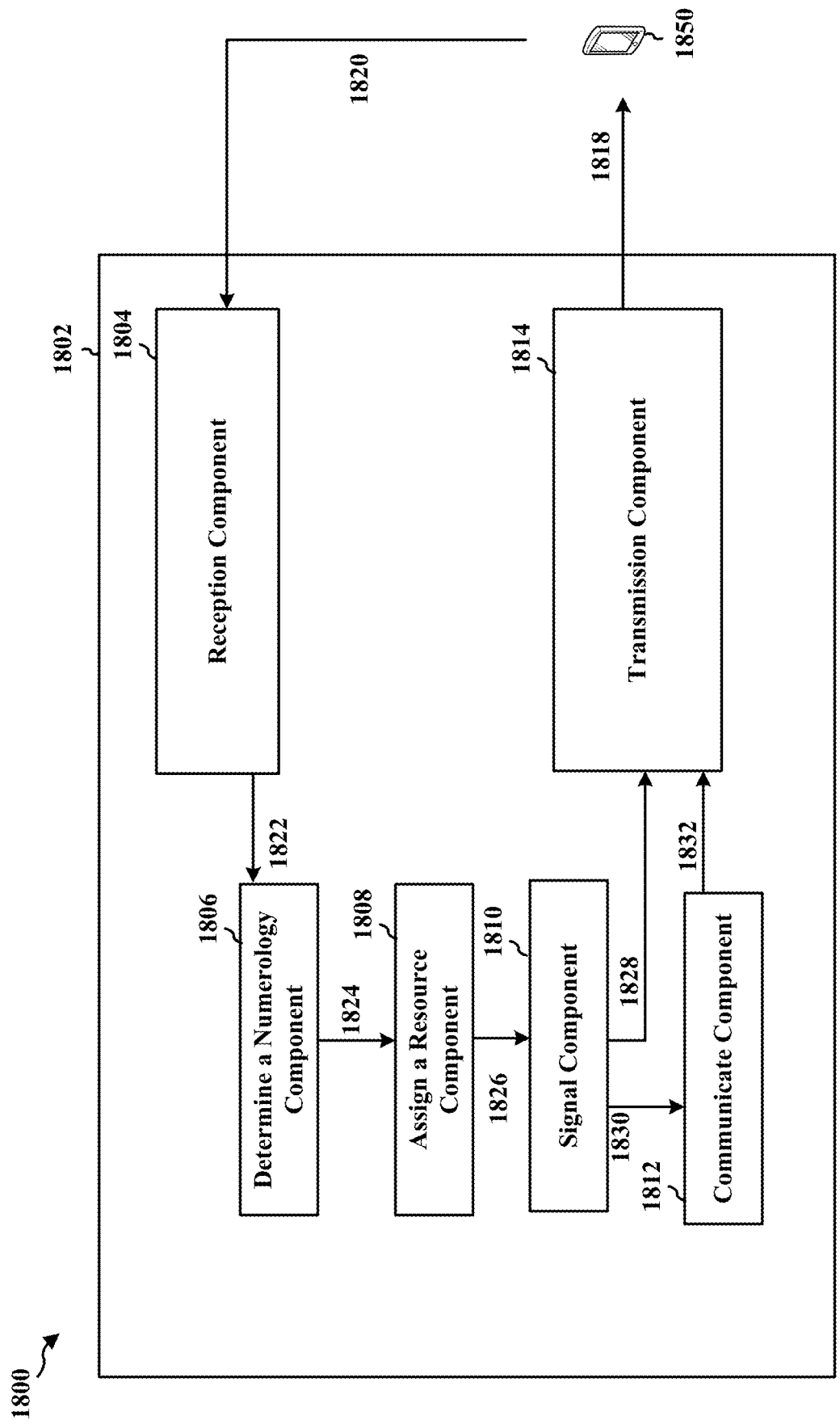
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station. The apparatus includes a component 1806 that determines a numerology 1824 associated with a resource, e.g., based on received data 1822. The received data 1822 may be received from a reception component 1804 and based on information received from an external transmission 1820, e.g., from a UE 1850 or other communication device (not shown). The apparatus also includes a component 1808 assigns a resource, e.g., a time and/or frequency resource, for use by the UE 1850, e.g., based on a numerology 1824. The assignment 1826 may be communicated to a component 1810. The component 1810 may receive the numerology and assignment 1826 and may signal the numerology using the assignment by transmitting the information 1828, 1830 to the transmission component 1814. The numerology may include at least one of a subcarrier spacing or a symbol duration associated with the resource and may be signaled in at least one of an MIB, a SIB, or RRC signaling.

The apparatus includes a component 1812 that communicate with the UE 1850 over the assigned resource based on the numerology, e.g., through the transmission component 1814. For example, the transmission component 1814 may transmit the numerology and communications with the UE 1850 using transmissions 1818 based on information 1828 received from the signal component 1810 and information 1832 received from the communicate component.

The apparatus may include additional components that perform each of the blocks of the algorithm in the aforementioned flowcharts of FIG. 17. As such, each block in the aforementioned flowcharts of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
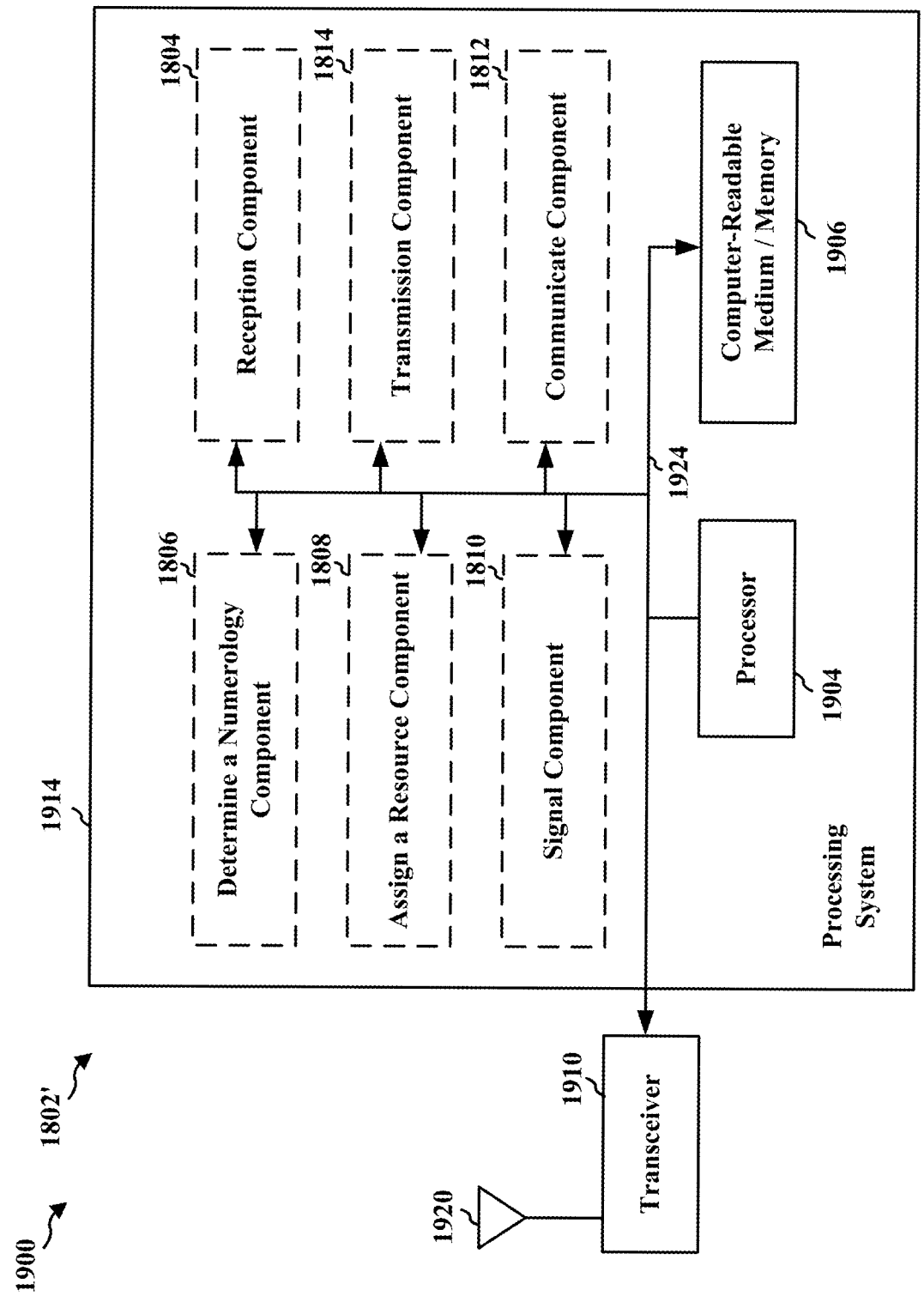
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804 receive a signal over the resource based on the transmitted numerology.

In addition, the transceiver 1910 receives information from the processing system 1914, specifically the transmission component 1814, may transmit the determined numerology associated with the resource or transmit communication. The transmission component 1814 may generate a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375.

The component 1812 determines a second numerology associated with a second resource. The component 1814 determines a sequence associated with the second resource based on the determined second numerology. The component 1806 determines a numerology associated with a resource;

In one configuration, the apparatus 1802/1802' for wireless communication includes means for determining a numerology associated with a resource, means for transmitting the determined numerology associated with the resource, and means for receiving a signal over the resource based on the transmitted numerology.

The apparatus 1802/1802' for wireless communication may include means for determining a second numerology associated with a resource, means for assign the resource for use by a user equipment, means for signal the numerology, and means for communicate with the user equipment over the assigned resource based on the numerology.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In an aspect, the symbol index corresponds to an index of a symbol with an earliest starting symbol among the one or more corresponding symbols or corresponds to an index of a symbol with a latest starting symbol among the one or more corresponding symbols.

In an aspect, the determining the at least one of the RB index, the symbol index, the frequency subcarrier index, or the symbol index may include determining numerology information for a set of RBs, wherein the RB index may be determined based on a location of an RB associated with the resource in relation to other RBs in the set of RBs and the numerology information for the set of RBs.

In an aspect, the sequence may be a reference signal, and the second signal may include the reference signal. In an aspect, the reference signal may include one of a DM-RS, a CSI-RS, or a MRS. In an aspect, the sequence may a scrambling code.

The transmitting may further include scrambling information based on the scrambling code and transmitting the scrambled information in the second signal.

In an aspect, a UE for wireless communication, may include means for determining a numerology associated with a resource for transmitting a signal, means for determining a sequence based on the determined numerology, and means for transmitting the signal based on the determined sequence.

In an aspect, a base station for wireless communication, may include means for determining a numerology associated with a resource, means for transmitting the determined numerology associated with the resource, and means for receiving a signal over the resource based on the transmitted numerology.

In an aspect, a base station for wireless communication may include a memory; and at least one processor coupled to the memory. The processor may be configured to: determine a numerology associated with a resource, transmit the determined numerology associated with the resource, and receive a signal over the resource based on the transmitted numerology.

In an aspect, a computer-readable medium of a user equipment (UE) may store computer executable code, may include code to determine a numerology associated with a resource for transmitting a signal, determine a sequence based on the determined numerology, and transmit the signal based on the determined sequence.

In an aspect, a computer-readable medium of a base station storing computer executable code, may include code to determine a numerology associated with a resource, transmit the determined numerology associated with the resource, and receive a signal over the resource based on the transmitted numerology.

An aspect may determine a second numerology associated with a second resource, determine a sequence associated with the second resource based on the determined second numerology, and transmit a second signal based on the determined sequence.

In an aspect determining the sequence may include determining at least one of a resource block (RB) index, a symbol index, a frequency subcarrier index, or a symbol index associated with the resource, and generating the sequence based on the at least one of the RB index, the symbol index. The frequency subcarrier index, or the symbol index may be associated with the resource.

In an aspect, the determining of the at least one of the RB index, the symbol index, the frequency subcarrier index, or the symbol index comprises performing one or more of determining the RB index by matching a first RB location of a first RB associated with the resource with a second RB location of a corresponding RB in a reference time-frequency grid having the determined numerology. The RB index may be based on the second RB location within the reference time-frequency grid.

An aspect may determine the symbol index by matching a first symbol location of a first symbol associated with the resource with a second symbol location of a corresponding symbol in a reference time-frequency grid having the determined numerology. The symbol index may be based on the second symbol location within the reference time-frequency grid.

An aspect may determine the frequency subcarrier index by matching a first frequency subcarrier location associated with the resource with a second frequency subcarrier location of a corresponding frequency subcarrier in a reference RB having the determined numerology. The frequency subcarrier index may be based on the second frequency subcarrier location within the reference RB; or An aspect may determine the symbol index by matching a first symbol location associated with the resource with a second symbol location of a corresponding symbol in a reference symbol having the determined numerology. The symbol index may be based on the second symbol location within the reference symbol.

In an aspect, the second RB location may be a closest corresponding RB location to the first RB location, wherein the second symbol location may be a closest corresponding symbol location to the first symbol location. The second frequency subcarrier location may be a closest corresponding frequency subcarrier location to the first frequency subcarrier location. The second symbol location may be a closest corresponding symbol location to the first symbol location.

In an aspect, the first RB has a first starting frequency that is less than or equal to a second starting frequency of the corresponding RB. The first RB may have the first starting frequency that is greater than or equal to the second starting frequency of the corresponding RB.

In an aspect, the first symbol may have a first starting symbol that precedes or coincides with a second starting symbol of the corresponding symbol. The first symbol may have the first starting symbol that follows or coincides with the second starting frequency of the corresponding symbol.

An aspect may include determining the at least one of the RB index, the symbol index, the frequency subcarrier index, or the symbol index including performing one or more of determining the RB index by matching a first RB location of the resource with a set of RB locations of one or more corresponding RBs in a reference time-frequency grid having a second numerology. The second numerology may be associated with a first subcarrier spacing that is less than or equal to a second subcarrier spacing associated with the numerology. The RB index may be determined based on the set of RB locations.

An aspect may include determining the symbol index by matching a first symbol location of the resource with a set of symbol locations of one or more corresponding symbols in a reference time-frequency grid having a second numerology. The second numerology may be associated with a first subcarrier spacing that is less than or equal to a second subcarrier spacing associated with the numerology. The symbol index may be determined based on the set of symbol locations.

An aspect may include determining the frequency subcarrier index by matching a first frequency subcarrier location of the resource with a set of frequency subcarrier locations of one or more corresponding frequency subcarriers in a reference RB having a second numerology. The second numerology may be associated with a first subcarrier spacing that is less than or equal to a second subcarrier spacing associated with the numerology. The frequency subcarrier index may be determined based on the set of frequency subcarrier locations.

An aspect may include determining the symbol index by matching a first symbol location of the resource with a set of symbol locations of one or more corresponding symbols in a reference symbol having a second numerology. The second numerology may be associated with a first subcarrier spacing that is less than or equal to a second subcarrier spacing associated with the numerology. The symbol index may be determined based on the set of symbol locations.

In an aspect, the RB index corresponds to an index of a lowest frequency RB among the one or more corresponding RBs or corresponds to an index of a highest frequency RB among the one or more corresponding RBs.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, in a unicast transmission, a downlink assignment or an uplink grant comprising an indication of assigned resources for use by the UE in communicating with a base station;
   determining, based on the indication of the assigned resources, a numerology comprising at least one of a subcarrier spacing or a symbol duration associated with the assigned resources, wherein the numerology is determined from among a plurality of numerologies including a first numerology having at least a first subcarrier spacing or a first symbol duration and a second numerology having at least a second subcarrier spacing or a second symbol duration;
   determining one or more indices for the assigned resources based on the numerology, wherein the one or more indices comprise an OFDM symbol index for the assigned resources, a slot index for the assigned resources, or a combination thereof;
   generating a sequence based on the one or more indices; and
   communicating with the base station based on the sequence.

2. The method of claim 1, wherein communicating with the base station comprises receiving a downlink transmission based on the downlink assignment and performing at least one of channel estimation based on the sequence or decoding scrambled data received in the downlink transmission based on the sequence.

3. The method of claim 1, wherein communicating with the base station comprises at least one of transmitting a reference signal in an uplink transmission or scrambling data for the uplink transmission based on the sequence, the uplink transmission being based on the uplink grant.

4. The method of claim 1, further comprising receiving information indicating the numerology from the base station, wherein the information is received in a master information block, MIB, a system information block, SIB, or in radio resource control, RRC, signaling.

5. The method of claim 1, wherein determining the numerology comprises determining the first numerology associated with first assigned resources and determining the second numerology associated with second assigned resources, and wherein the first numerology is different than the second numerology.

6. The method of claim 1, wherein determining the one or more indices for the assigned resources comprises one or more of:
   determining a resource block (RB) index by matching a first RB location of a first RB associated with the assigned resources with a second RB location of a corresponding reference numerology, wherein the RB index is based on the second RB location within the corresponding reference numerology;
   determining a symbol index by matching a first symbol location of a first symbol associated with the assigned resources with a second symbol location of the corresponding reference numerology, wherein the symbol index is based on the second symbol location within the corresponding reference numerology; or
   determining a frequency subcarrier index by matching a first frequency subcarrier location associated with the assigned resources with a second frequency subcarrier location in the corresponding reference numerology, wherein the frequency subcarrier index is based on the second frequency subcarrier location within the corresponding reference numerology.

7. The method of claim 1, wherein determining the one or more indices for the assigned resources is based on an indexed time-frequency grid having a reference numerology.

8. The method of claim 1, wherein the determining the numerology comprises determining the subcarrier spacing and the symbol duration associated with one of a plurality of uplink (UL) resources or downlink (DL) resources in the assigned resources, wherein the one of the plurality of UL resources or DL resources comprises at least two different subcarrier spacings or symbol durations.

9. The method of claim 1, wherein the numerology is determined based on the indication.

10. The method of claim 1, wherein the sequence includes a reference signal or a scrambling code.

11. An apparatus for wireless communication at a user equipment, UE, comprising:
   memory; and
   at least one processor coupled to the memory and configured to cause the UE to:
      receive, in a unicast transmission, a downlink assignment or an uplink grant comprising an indication of assigned resources for use by the UE in communicating with a base station;

determine a numerology, based on the indication of the assigned resources, comprising at least one of a subcarrier spacing or a symbol duration associated with the assigned resources, wherein the numerology is determined from among a plurality of numerologies including a first numerology having at least a first subcarrier spacing or a first symbol duration and a second numerology having at least a second subcarrier spacing or a second symbol duration;

determine one or more indices for the assigned resources based on the numerology, wherein the one or more indices comprise an OFDM symbol index for the assigned resources, a slot index for the assigned resources, or a combination thereof;

generate a sequence based on the one or more indices; and communicate with the base station based on the sequence.

12. The apparatus of claim 11, wherein to communicate with the base station, the at least one processor is configured to cause the UE to:

receive a downlink transmission based on the downlink assignment and to perform at least one of channel estimation based on the sequence or decoding scrambled data received in the downlink transmission based on the sequence.

13. The apparatus of claim 11, wherein communicating with the base station comprises at least one of transmitting a reference signal in an uplink transmission or scrambling data for the uplink transmission based on the sequence, the uplink transmission being based on the uplink grant.

14. The apparatus of claim 11, wherein the at least one processor is further configured to cause the UE to receive information indicating the numerology from the base station, wherein the information is received in a master information block, MIB, a system information block, SIB, or in radio resource control, RRC, signaling.

15. The apparatus of claim 11, wherein to determine the numerology, the at least one processor is configured to cause the UE to determine the first numerology associated with first assigned resources and determine the second numerology associated with second assigned resources, and wherein the first numerology is different than the second numerology.

16. The apparatus of claim 11, wherein to determine the one or more indices for the assigned resources, the at least one processor is configured to cause the UE to perform one or more of:

determine a resource block (RB) index by matching a first RB location of a first RB associated with the assigned resources with a second RB location of a corresponding reference numerology, wherein the RB index is based on the second RB location within the corresponding reference numerology;

determine a symbol index by matching a first symbol location of a first symbol associated with the assigned resources with a second symbol location of the corresponding reference numerology, wherein the symbol index is based on the second symbol location within the corresponding reference numerology; or determine a frequency subcarrier index by matching a first frequency subcarrier location associated with the assigned resources with a second frequency subcarrier location in the corresponding reference numerology, wherein the frequency subcarrier index is based on the second frequency subcarrier location within the corresponding reference numerology.

17. The apparatus of claim 11, the one or more indices for the assigned resources are based on indexed time-frequency grid having a reference numerology.

18. The apparatus of claim 11, wherein to determine the numerology, the at least one processor is configured to cause the UE to determine the subcarrier spacing and the symbol duration associated with one of a plurality of uplink (UL) resources or downlink (DL) resources in the assigned resources, wherein the one of the plurality of UL resources or DL resources comprises at least two different subcarrier spacings or symbol durations.

19. The apparatus of claim 11, wherein the at least one processor is configured to cause the UE to determine the numerology based on the indication.

20. The apparatus of claim 11, wherein the sequence includes a reference signal or a scrambling code.

21. A method for wireless communication at a network entity, comprising:

determining, at the network entity, a numerology associated with a resource, wherein the numerology comprises at least one of a subcarrier spacing or a symbol duration associated with the resource, wherein the numerology is determined from among a plurality of numerologies including a first numerology having at least a first subcarrier spacing or a first symbol duration and a second numerology having at least a second subcarrier spacing or a second symbol duration;

assigning, at the network entity, the resource for use by a user equipment (UE);

signaling, from the network entity to the UE via a unicast transmission, an indication of the numerology in a downlink assignment or an uplink grant that assigns the resource for use by the UE; and communicating with the UE over the assigned resource using a sequence based on one or more indices associated with the numerology, wherein the one or more indices comprise an OFDM symbol index for the resource, a slot index for the resource, or a combination thereof.

22. The method of claim 21, further comprising:

determining the first numerology for a first portion of the resource and the second numerology for a second portion of the resource, and wherein a signal of the numerology signals the first numerology and the second numerology.

23. The method of claim 21, wherein determining the numerology associated with the resource includes:

determining the subcarrier spacing and the symbol duration associated with one of a plurality of uplink (UL) resources or downlink (DL) resources, wherein the one of the plurality of UL resources or DL resources comprises at least two different subcarrier spacings or symbol durations.

24. The method of claim 21, wherein the sequence includes a reference signal or a scrambling code.

25. An apparatus for wireless communication at a network entity, comprising:

memory; and at least one processor coupled to the memory and configured to cause the network entity to:

determine a numerology comprising at least one of a subcarrier spacing or a symbol duration associated with a resource, wherein the numerology is determined from among a plurality of numerologies including a first numerology having at least a first subcarrier spacing or a first symbol duration and a second numerology having at least a second subcarrier spacing or a second symbol duration;

assign the resource for use by a user equipment (UE);

signal to the UE via a unicast transmission an indication of the numerology in a downlink assignment or an uplink grant that assigns the resources for use by the UE; and communicate with the UE over the assigned resource based on a sequence using a seed that is a function of one or more indices associated with the numerology, wherein the one or more indices comprise an OFDM symbol index for the resource, a slot index for the resource, or a combination thereof.

26. The apparatus of claim 25, wherein the at least one processor is further configured to cause the network entity to:

determine the first numerology for a first portion of the resource and the second numerology for a second portion of the resource, and wherein to signal the numerology, the at least one processor is configured to cause the network entity to signal the first numerology and the second numerology.

27. The apparatus of claim 25, wherein to determine the numerology associated with the resource, the at least one processor is configured to cause the network entity to:

determine the subcarrier spacing and the symbol duration associated with one of a plurality of uplink (UL) resources or downlink (DL) resources, wherein the one of the plurality of UL resources or DL resources comprises at least two different subcarrier spacings or symbol durations.

28. The apparatus of claim 25, wherein the sequence includes a reference signal or a scrambling code.

29. The method of claim 1, wherein the one or more indices comprise the OFDM symbol index for the assigned resources.

30. The method of claim 1, wherein the one or more indices comprise the slot index for the assigned resources.

31. The method of claim 1, wherein the one or more indices comprise the combination of the OFDM symbol index for the assigned resources and the slot index for the assigned resources.

32. The apparatus of claim 11, wherein the one or more indices comprise the OFDM symbol index for the assigned resources.

33. The apparatus of claim 11, wherein the one or more indices comprise the slot index for the assigned resources.

34. The apparatus of claim 11, wherein the one or more indices comprise the combination of the OFDM symbol index for the assigned resources and the slot index for the assigned resources.

35. The apparatus of claim 11, wherein the at least one processor is comprised in a processing system configured to cause the UE to:

receive, in the unicast transmission, the downlink assignment or the uplink grant comprising the indication of the assigned resources for use by the UE in communicating with the base station;

determine the numerology, based on the indication of the assigned resources, comprising at least one of the subcarrier spacing or the symbol duration associated with the assigned resources;

determine the one or more indices for the assigned resources based on the numerology;

generate the sequence based on the one or more indices; and communicate with the base station based on the sequence.

36. The method of claim 21, wherein the one or more indices comprise the OFDM symbol index for the assigned resource.

37. The method of claim 21, wherein the one or more indices comprise the slot index for the assigned resource.

38. The method of claim 21, wherein the one or more indices comprise the combination of the OFDM symbol index for the assigned resources and the slot index for the assigned resource.

39. The apparatus of claim 25, wherein the one or more indices comprise the OFDM symbol index for the assigned resource.

40. The apparatus of claim 25, wherein the one or more indices comprise the slot index for the assigned resource.

41. The apparatus of claim 25, wherein the one or more indices comprise the combination of the OFDM symbol index for the assigned resources and the slot index for the assigned resource.

42. The apparatus of claim 25, wherein the at least one processor is comprised in a processing system configured to cause the network entity to:

determine the numerology comprising at least one of the subcarrier spacing or the symbol duration associated with the resource;

assign the resource for use by the UE;

signal to the UE via the unicast transmission the indication of the numerology in the downlink assignment or the uplink grant that assigns the resource for use by the UE; and communicate with the UE over the assigned resources using the sequence that is based on the one or more indices associated with the numerology.

* * * * *